(12) United States Patent
Riedy et al.

(10) Patent No.: US 12,346,092 B2
(45) Date of Patent: Jul. 1, 2025

(54) MANAGEMENT PLATFORM FOR AUTONOMOUS DRONE OPERATIONS

(71) Applicant: Airtonomy, Inc., Grand Forks, ND (US)

(72) Inventors: Joshua Michael Riedy, Grand Forks, ND (US); Nicholas Anthony Zaccardi, Grand Forks, ND (US)

(73) Assignee: Airtonomy, Inc., Grand Forks, ND (US)

( * ) Notice: Subject to any disclaimer, the term of this patent is extended or adjusted under 35 U.S.C. 154(b) by 177 days.

(21) Appl. No.: 17/396,855

(22) Filed: Aug. 9, 2021

(65) Prior Publication Data

US 2023/0052343 A1    Feb. 16, 2023

(51) Int. Cl.
*G05B 19/4155*    (2006.01)
*G05D 1/00*    (2006.01)

(52) U.S. Cl.
CPC ....... *G05B 19/4155* (2013.01); *G05D 1/0276* (2013.01); *G05B 2219/40153* (2013.01)

(58) Field of Classification Search
CPC ........ G05B 19/00; G05B 19/02; G05B 19/18; G05B 19/4155; G05B 2219/00; G05B 2219/30; G05B 2219/40; G05B 2219/40153; G05D 1/00; G05D 1/02; G05D 1/021; G05D 1/0276; G05D 1/0278;

(Continued)

(56) References Cited

U.S. PATENT DOCUMENTS

| 9,864,372 B2 | 1/2018 | Chen et al. |
| 2017/0206848 A1 | 7/2017 | Jeon et al. |
| 2019/0137995 A1* | 5/2019 | Tan ...................... G05D 1/0094 |

(Continued)

FOREIGN PATENT DOCUMENTS

WO    2023018532    2/2023

OTHER PUBLICATIONS

"International Application Serial No. PCT US2022 037870, International Search Report mailed Dec. 16, 2022", 2 pgs.

(Continued)

*Primary Examiner* — Khoi H Tran
*Assistant Examiner* — Sarah A Tran
(74) *Attorney, Agent, or Firm* — Schwegman Lundberg & Woessner, P.A.

(57) ABSTRACT

Methods, systems, and computer programs are presented for executing a mission by an autonomous device to inspect an asset. One method includes an operation for obtaining a workflow. The workflow includes operations to be executed during a mission to be performed by a robot and a destination for sending data resulting from the mission. The method further includes an operation for generating a package after completion of the mission associated with the workflow. The package is self-contained and comprises information obtained during the mission that enables generation of results. The package comprises sensor information collected by one or more sensors, telemetry information obtained by the robot, information about assets associated with the mission, software version identifier for the package generation, and routing information for transmitting the package to the destination. The method further includes an operation for analyzing the information of the package to determine results for the mission.

19 Claims, 17 Drawing Sheets

(58) Field of Classification Search
CPC ...... G05D 1/028; G05D 1/0282; G06Q 10/00; G06Q 10/20; G06V 20/00
See application file for complete search history.

(56) References Cited

U.S. PATENT DOCUMENTS

| | | |
|---|---|---|
| 2019/0265694 A1* | 8/2019 | Chen .................... G08G 5/0069 |
| 2019/0265894 A1 | 8/2019 | Maeda et al. |
| 2021/0092604 A1* | 3/2021 | Fox ...................... H04W 12/08 |
| 2022/0050460 A1 | 2/2022 | Karachalios et al. |
| 2022/0050461 A1 | 2/2022 | Karachalios et al. |

OTHER PUBLICATIONS

"International Application Serial No. PCT US2022 037870, Written Opinion mailed Dec. 16, 2022", 4 pgs.

"International Application Serial No. PCT US2022 037870, International Preliminary Report on Patentability mailed Feb. 22, 2024", 6 pgs.

* cited by examiner

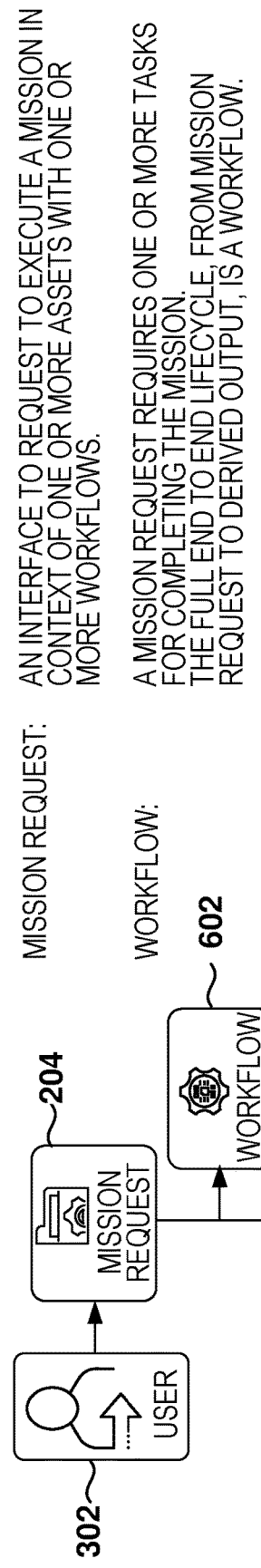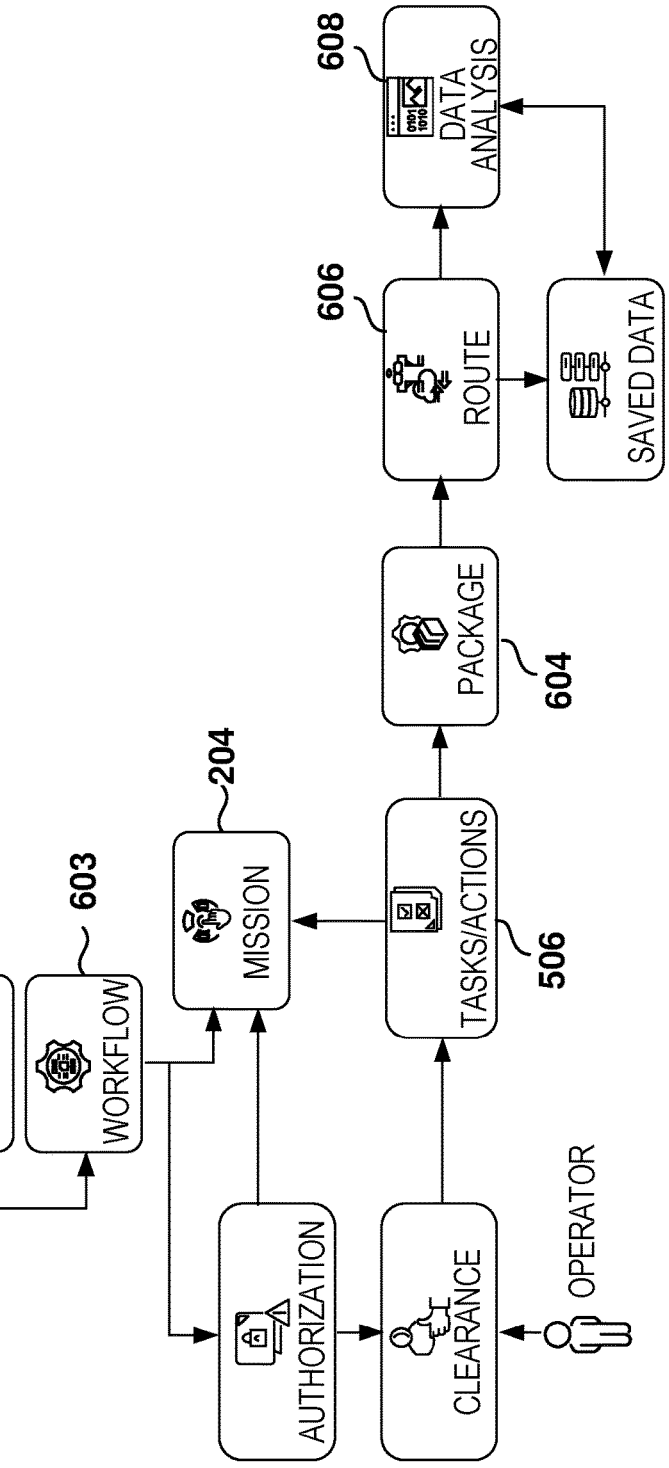
FIG. 6

MANAGEMENT PLATFORM FOR AUTONOMOUS DRONE OPERATIONS

TECHNICAL FIELD

The subject matter disclosed herein generally relates to methods, systems, and machine-readable storage media for autonomous and manual vehicle operations.

BACKGROUND

Autonomous vehicles and Unmanned Aerial Vehicles (UAV) (drones) are collecting vast amounts of data for business purposes, such as to inspect business assets (e.g., wind turbine, power distribution, communication towers, storage tanks, avian mortality assessment), but the large amount of data is sometimes difficult to process. For example, a large number of images are captured, and it would take a human a large amount of time to inspect the large number of images, so automated analysis by computers is desired. Further, an inspection may involve coordinating the drone hardware, preparation activities, flight planning, traveling to the inspection site, downloading the instructions to the vehicle, gathering the data, storing the data, provide search tools for searching the data, and analyze the data to present useful insights for the business unit.

One of the biggest problems with the automated analysis is the lack of uniformity for capturing data, processing the data, and presenting results. Multiple tools exist to solve point problems in complex architectures, but the tools do not often "speak the same language," and great integration efforts are required to implement solutions. Further, anytime there is a change in the system, all the components must be revaluated, which is often costly and time consuming.

BRIEF DESCRIPTION OF THE DRAWINGS

Various of the appended drawings merely illustrate example embodiments of the present disclosure and cannot be considered as limiting its scope.

FIG. 6 is a diagram illustrating the process for requesting a mission, according to some example embodiments.

DETAILED DESCRIPTION

Figure 1:
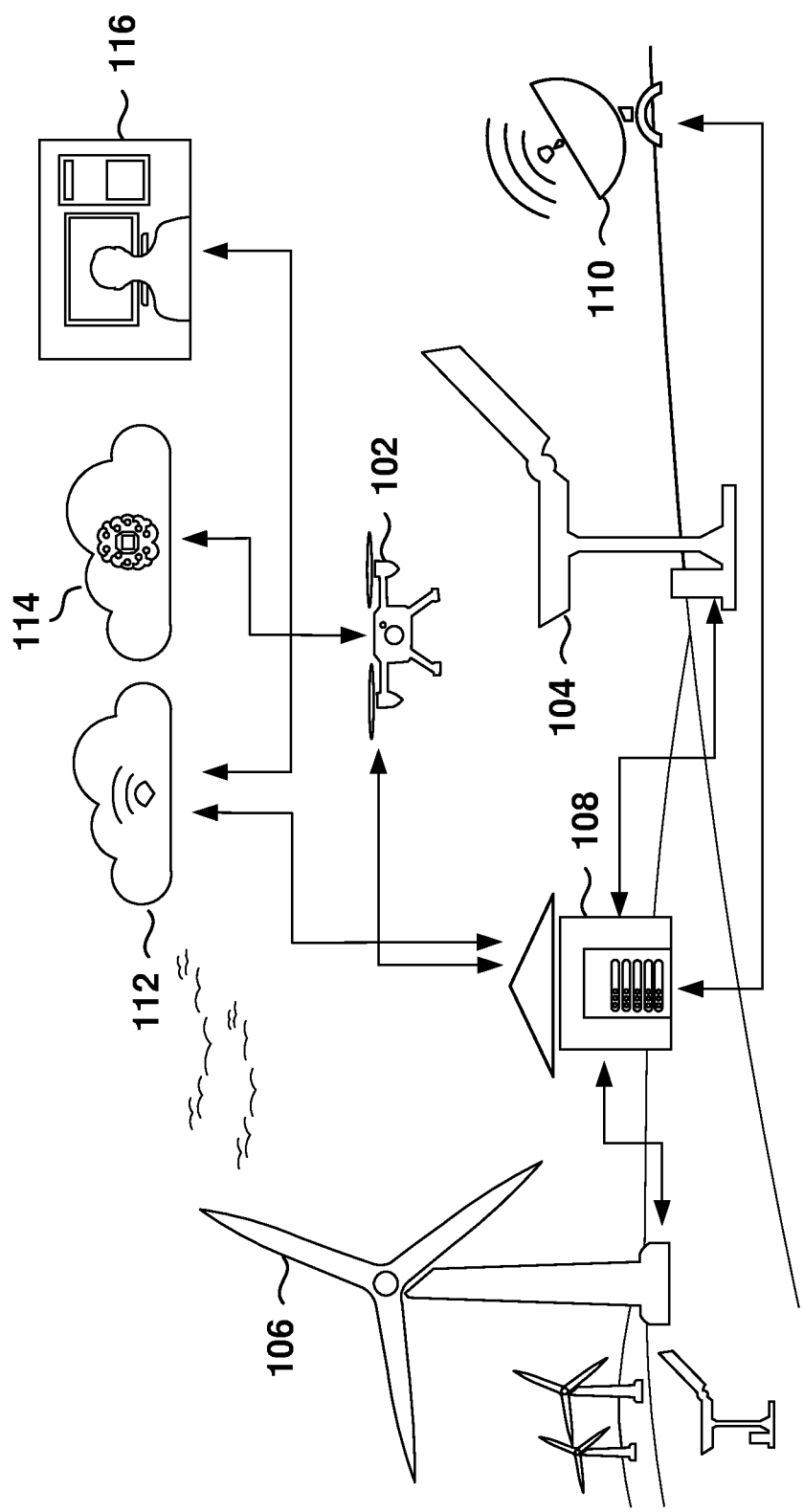
FIG. 1 is a diagram illustrating a sample method for inspecting assets using an autonomous drone.

Example methods, systems, and computer programs are directed to executing a mission by an autonomous device to inspect an asset. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A drone data management (DDM) system is presented with a plurality of flexible components that provide an infrastructure for customer systems to easily configure, authorize, and manage autonomous/manual missions executed by self-navigating robots, such as an UAV (Unmanned Aerial Vehicle), also referred to as drones.

What is needed is a system that is flexible for accommodating multiple tools, multiple machine learning/computer vision models, creation of structured datasets on edge hardware upon inception, and means to index stored datasets pre and post analysis.

One general aspect includes a method that includes an operation for obtaining a workflow. The workflow includes operations to be executed during a mission to be performed by a robot and a destination for sending data resulting from the mission. The method further includes an operation for generating a package after completion of the mission associated with the workflow. The package is self-contained and comprises information obtained during the mission that enables generation of results. The package comprises sensor information collected by one or more sensors, telemetry information obtained by the robot, information about assets associated with the mission, software version identifier for the package generation, and routing information for transmitting the package to the destination. The method further includes an operation for analyzing the information of the package to determine results for the mission.

Glossary

An asset is an object to be inspected. An asset can have equipment that is in need of inspection via an action.

Equipment is an individual component to be inspected. The equipment is included as an asset in a task, and the task defines the data to be captured with sensors. The equipment is included as part of the mission.

An asset database is computer storage that contains asset and equipment information. The asset information is populated before creating the mission request for a workflow.

An action is an operation, triggered by an operator, that produces data to be packaged and passed to computer systems. An action is a specific instance of a task associated with a given asset. The resultant output is a package. One example is flying a drone from takeoff to landing.

A Task is an inspection to collect data at a particular part of an asset for a particular set of targets. A task is an instance of an action, which represents the unique combination of robotic vehicle, procedures, sensors, routine parameters, and routine outputs. For example, inspecting a given wind turbine and it can include multiple actions.

A workflow is the representation of the operations needed for an inspection, and it can include missions, a package, a route, data processing, and data analysis. When the workflow is approved by the management program, the workflow becomes an approved workflow.

An authorization is an approval to perform a task, and it may require approval by one or more individuals. A workflow can model the approval by attaching the authorization to the mission, which is comprised of tasks.

A clearance is an individual security pass that is transferred to the drone to enable use of the drone by the operator. One or more clearances allow the operator to complete the actions needed to fulfill the mission.

A robot is a combination of a robotic vehicle, a companion computer, control software, and sensors that is used to perform a action. The robot can be configurable to perform the mission in autonomous mode. For example, a robot may be a combination of a drone, plus a camera, plus software for the companion computer. Another example of a robot is a crawler with sensors that enable internal inspection of pipelines.

A companion computer is a computing device installed in the robot, also referred to as an on-board computer or an edge computer.

A robotic vehicle is a vehicle (e.g., terrestrial, flying) that can be operated in autonomous mode controlled by the companion computer when executing a mission, or can be manually operated, especially in situation where autonomy is not feasible.

Control Software is software utilized to plan, start, and end an action on a robot, and, in some embodiments, is embedded in the robot.

Sensors are the hardware devices used to collect data about an asset while executing a particular action.

A mission is a set of tasks to be performed by a robot and can span multiple assets and multiple workflows. For example, a mission can include a site-wide inspection for multiple assets. Further, when operating a robot, a mission represents the combination of particular tasks against particular assets with a particular authorization that generates actions when the mission is executed.

A mission request is an interface to request execution of a mission in context of one or more assets with one or more workflows. The asset information is populated before the creation of the mission request. Further, a maintenance plan can produce mission requests (e.g., work orders) on a predefined schedule.

A data catalog is a list of the data stored across one or more cloud providers as a result of processing. For example, the data catalog may include the list of data from packages processed by a machine learning algorithm or third-party application.

A global event log is a program that tracks the actions related to drone data management that begins with a mission request. The global event log logs all the events in the mission from tasks to actions and uploads to data analysis.

A manifest describes what is contained within the package and contains mission information and a route from the workflow.

A package is a set of organized data collected by the robot and data related to the mission.

A route is information for the destination of a package after a task is completed. For example, the final location in cloud storage.

A routine is a set of instructions for the robot for inspecting an asset in order to complete an action. The routine might be fully-autonomous, operator-assisted, or manually controlled.

Routine parameters are the inputs for the variables of a routine defining how actions associated with the routine are to be performed.

FIG. 1 illustrates a sample method for inspecting assets 106 using a drone 102. A user interfaces with a control program or controller 116 to request autonomous inspection of assets 106, e.g., a wind turbine. A data center 108 includes electronic equipment that includes software and hardware for managing missions, storing data, analyzing the data, etc.

Additionally, cloud services 112, 114 are used for data storage and for using computer processors to analyze the data. Once the user enters the request for inspection, (e.g., communicated to the field via wireless communications 110), the drone 102 flies to the asset and captures sensor data, (e.g., images of the turbines to detect defects, images of the ground to detect dead birds, measurements of gas sensor, temperature measurements, LIDAR measurements). A housing 104 hosts the drone 102 while not in use.

After the drone 102 returns to the housing 104, the data is uploaded, such as to one of the cloud services 112, 114. Data analysis is then performed on the collected data to determine problems. For example, a machine learning (ML) program analyzes the data to detect defects on the wind turbines. The results may then be observed by the user via the user interface (UI) of the control program 116.

Each mission requires an authorization before it can be executed. In some example embodiments, the operation of the drone 102 is autonomous because the mission assigned to the drone 102 includes the required parameters for the drone 102 to fly to the required asset 106, capture the necessary data (e.g., multiple pictures of sections of each of the blades), package the data, and then download the data for analysis.

It is noted that some embodiments are presented with autonomous UAVs, but the same principles may be used for other autonomous vehicles, which are referred to as robots. Further, the inspections may be many types of assets besides wind turbines, such as avian mortality assessment, or agricultural crops.

Figure 2:
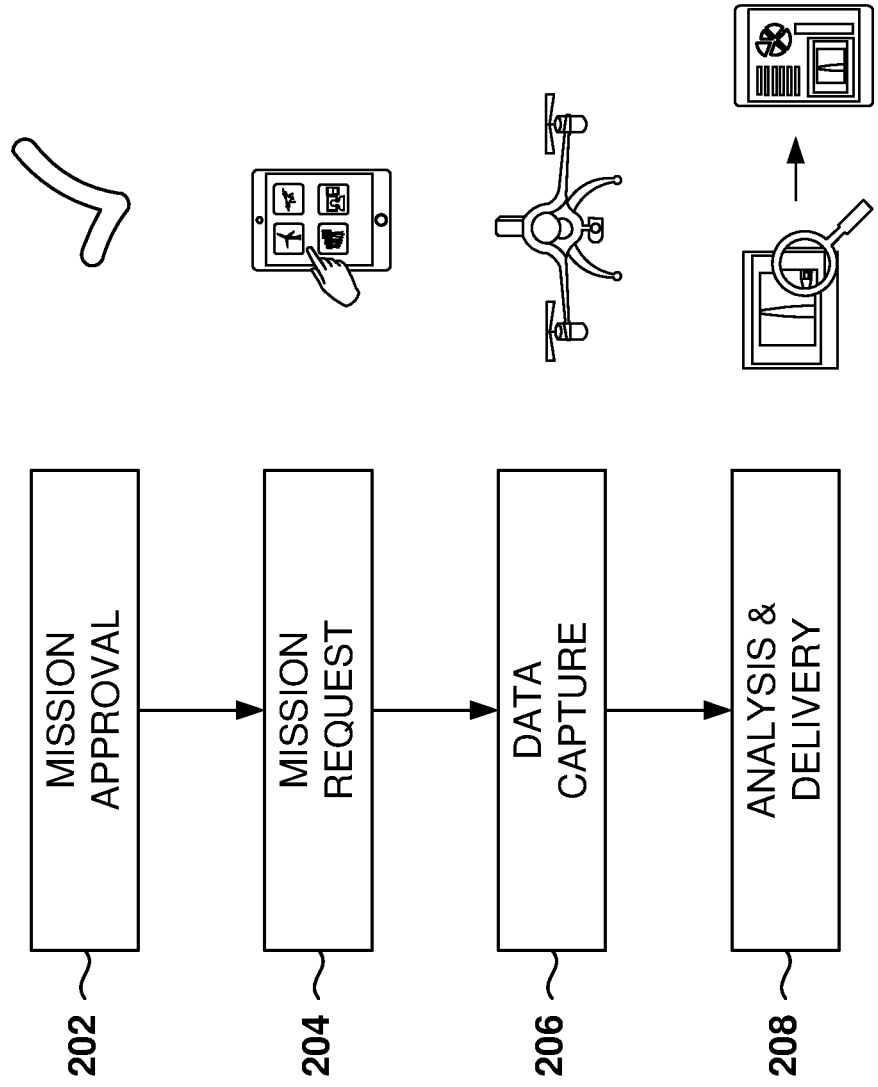
FIG. 2 is a flowchart of a method for drone data management, according to some example embodiments.

FIG. 2 is a flowchart of a method for drone data management, according to some example embodiments. The architecture for drone data management builds on use cases and enables the use of automated workflows.

At operation 202, the mission is approved. An administrator utilizes the management program to select a workflow and then entering the request. The authorization process includes approving the mission by one or more persons that have authority to enable the mission.

After the mission is approved, the method flows to operation 204 where a mission request is generated. The mission is requested by an operator on the field that is authorized to initiate the mission.

The mission is then executed by the robot that travels to the required location to inspect the asset and captures the data 206. After the robot ends the task, the data captured by the robot is downloaded and placed in a package that is stored on a server, such as a cloud server.

The stored data is then analyzed, and the results delivered to the user at operation 208. For example, the data may show images of a wind turbine or the result may be a fault on one of the turbines, such as a crack on the blade.

Figure 3:
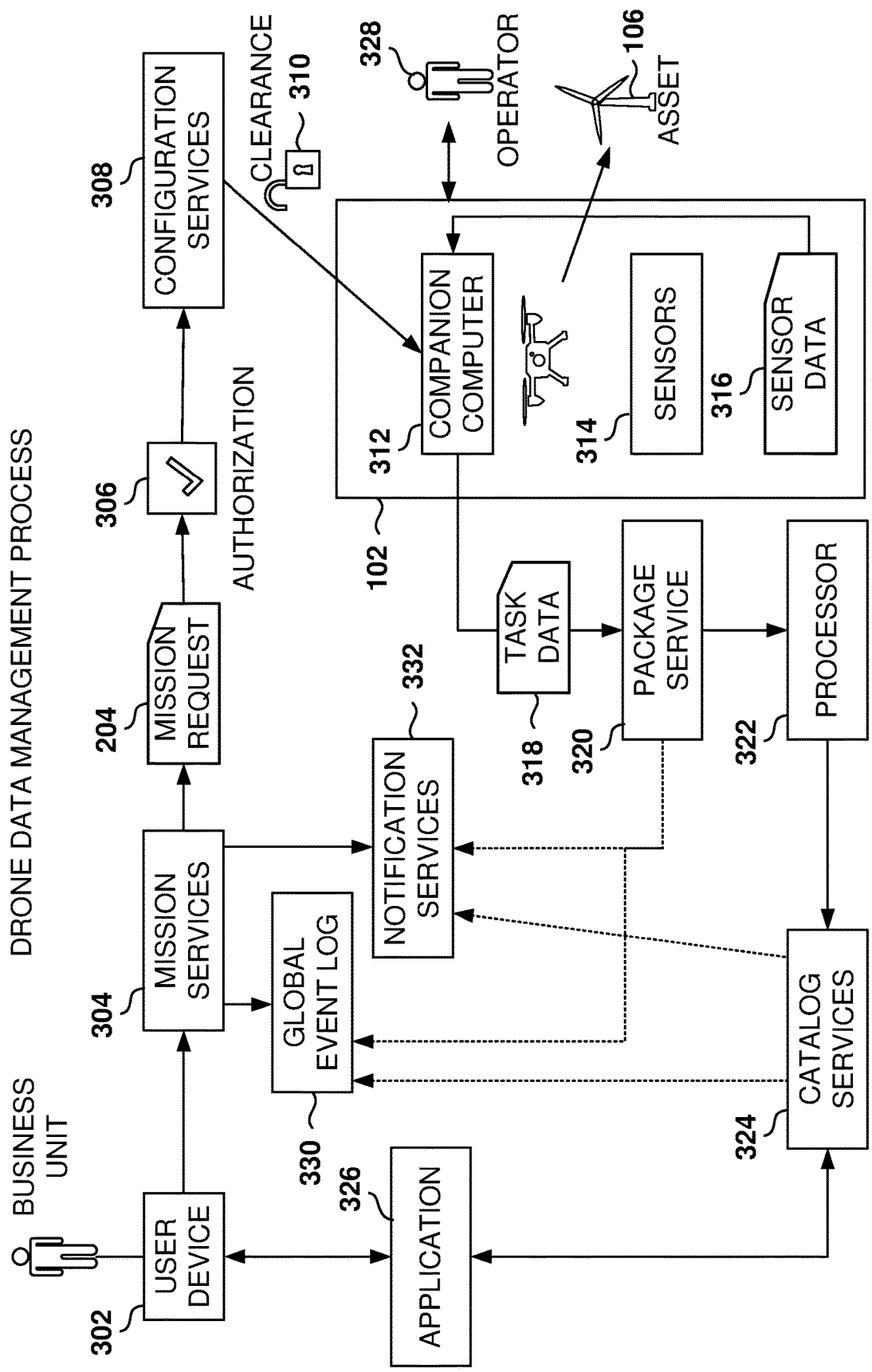
FIG. 3 is a diagram illustrating the drone data management process, according to some example embodiments.

FIG. 3 illustrates the drone data management process, according to some example embodiments. The drone data management (DDM) workflow includes a user device 302, executing the mission, and then making results available to the user device 302 via an application 326. The user device 302 may enter the request through a UI in the application 326 or via a separate application. The DDM system provides the tools to enable the user device 302 to activate the desired mission.

The UI may present a set of workflows on the user device 302 and the user may select one of the workflows for execution. In some cases, parameters associated with the workflow are entered by the user in the user device 302 (e.g., turbine identifier for executing a turbine inspection).

The DDM system provides an easy way for the user to make a request that may be executed hundreds of miles away, such as instructing a drone to fly to a particular location, in a particular pattern, and take sensor data that can be used for detecting problems.

A mission may include multiple tasks. In the case of the wind turbine inspection, the turbines are separated by great distances in the ground may have to fly to a particular turbine taking 10 to 20 minutes. While the drone is inspecting the turbine, it will be beneficial to also inspect the ground around the turbine and save one trip. The EPA has requirements for how many birds can be killed as a part of the wind turbine running, so there is a need to inspect for dead birds and perform an avian-mortality inspection. Thus, the mission may include a task to take images of the blades of the turbine and images of the ground around the base of the turbine. The mission is associated with one or more assets 106, e.g., inspect one asset 106, part of one asset, or a plurality of assets. The asset can be of different types and the DDM system is generic and not tied to just one particular kind of asset, e.g., wind turbines, distribution power lines, boilers, solar farms, and cell-phone towers.

The user device 302 interfaces with mission services 304, which is the process that generates the missions. Mission services 304 provides a UI for entering requests, and also provides an Application Programming Interface (API) so the request may be entered programmatically, allowing the business unit to develop its own interfaces that may be integrated with other tools used by the business unit.

In some cases, the request may not be generated by the user device 302, but by another program of the business unit that interfaces with mission services 304. For example, a program that schedules periodic inspections of electric power lines.

Mission services 304 interacts with the global event log 330 and notification services 332. The global event log 330 tracks the actions related to DDM that begins with the generation of the mission request 204. When the new mission is created, the global event log 330 logs the event, in effect creating a new project in the log.

The global event log 330 allows users and systems to keep track of what the robots are doing, what missions the user device 302 has requested, which missions are in progress, etc. This information is available to other components of the DDM system like catalog services 324, configuration services 308, and the package service 320.

Once the mission request 204 is generated, the mission request 204 has to be authorized 306, and once it is authorized for execution, the authorized mission request 204 is sent to configuration services 308.

Configuration services 308 takes the mission request 204 and generates the workflow, which includes the instructions for the hardware and software that will execute the mission. For example, if there are multiple types of drones in operation, configuration services 308 will determine the instruction for the particular drone that will execute the inspection of the asset 106. Similarly, configuration services 308 will configure other types of hardware, such as cameras, LIDAR, and companion computers.

By having configuration services 308, the system is not tied down to one particular instance of hardware, and there is flexibility to add new hardware or updated versions of existing hardware, in order to have a flexible system that easily evolves over time.

Further, configuration services 308 validates that the operator 328 on the field has the permissions required to activate the mission on the field. For example, if the operator 328 has not gone through the required training, then the operator 328 does not have permission to execute the mission and the clearance 310 will not be generated.

If everything is ready for execution on the mission, including hardware, software, and operator permissions, a clearance 310 is generated on device so the mission may be executed, e.g., the mission is enabled on a companion computer 312 on the drone 102.

In some example embodiments, the drone 102 includes the drone itself, the companion computer 312, and sensors 314 that generate sensor data 316. The companion computer 312 includes the instructions for flying the drone (or operate any other type of robot), e.g., a sentry to fly over a rectangle of land defined by given coordinates. Further, the companion computer 312 may activate the collection of sensor data 316 by the sensors 314, such as determining when to capture images of the asset 106.

Once the companion computer 312 has the mission, an operator 328 interacts with the companion computer 312 to start the mission. For example, the operator may use a mobile device in wireless communication with the companion computer 312, other types of interfaces are also possible, such as a removable wired connection (e.g., a USB keyboard).

It is noted that that the operator 328 is not referred to as a pilot, although a pilot may be an operator. The operator 328 does not need to have a pilot's license to fly the drone 102, as the operation of the drone 102 is autonomous. For example, the operator may be a specialist in turbine inspections and not have a pilot license, yet it is possible to perform the mission without requiring the services of a pilot.

Once the operator 328 activates the mission, the drone takes off, flies to the desired location and starts collecting sensor data 316. After the sensor data is collected, the drone finishes the flying routine (e.g., returning to the base where it took off from, or to another designated site).

The data from the mission, referred to as the action data 318, is sent to a package service 320. The task data 318 may include sensor data 316 and route data. The package service 320 may reside in a cloud service or on some other computing device.

The package service 320 collects the task data 318 and adds additional data associated with the mission. For example, a piece of task data 318 may be a photograph taken at certain time in certain direction, and packaging service 320 will associate that photograph with a particular section of one of the blades of the turbine. This way, the later analysis of the information can be faster and more precise.

Thus, the routine 320 has additional metadata information about the sensor data 316 collected, including the identification of the mission associated with the flight. Further, the package service 320 stores the data in a uniform way so data search is easier and faster. Instead of just saving data blobs in a cloud service, the package service 320 stores structured data with defined fields that can be used for data analysis, such as the use of machine-learning models to detect equipment malfunction.

Once the package is created, the package service 320 sends the information to processor 322, which is an external processor that may reside on a cloud service or on another server, such as a business unit's server.

The package service 320 also updates the global event log 330 and the notification services 332 (e.g., to send a mission-completed notice to the user device 302). The global event log 330 updates the status of the mission accordingly (e.g., mission completed, mission delayed, mission failed).

Catalog services 324 takes the package data and formats the package data according to the business unit requirements. The data is then stored in a structure format that is readily available for analysis.

In some example embodiments, the data is stored as objects that have an associated object type. Some example object types are images, LIDAR readings, location coordinates, temperature readings, infrared readings, etc. For some objects, there are associated operations performed on the object data, such as thumbnailing images of image objects. The objects include data identifying the mission that generated the data, and the mission parameters.

In some example embodiment, the stored data includes generational data, which refers to the same mission performed multiple times, e.g., every month or every year. This way the data analysis may include a comparison of the generational data to determine changes in the asset 106.

Catalog services 324 analyzes the data and generate conclusions that are available as reports. For example, the data analysis may include ML models that use the package data and makes a determination (e.g., power line broken, turbine down, cracked turbine, etc.).

In some example embodiments, the DDM system is implemented on resources provided by a third-party service provider and the business unit accesses these services. In some example embodiments, the third-party service provider manages mission services 304, configuration services 308, global event log 330, notification services 332, package service 320, and catalog services 324.

The DDM system allows the business unit to manage its own data, as well as developing the applications used to access and analyze the data, although the business unit may also use the applications provided by the DDM system. For example, the business unit may store the data on a cloud service and use its own ML models to analyze the data. The DDM service provider may generate a framework to train ML programs with a training set of the customer to generate the ML models.

In some example embodiments, catalog services 324 provides an API to allow programmatic access to the data, such as by the application 326 that is available to the user device 302. This way, the business unit may develop its own custom applications without having to rely on the DDM service provider.

The benefits of the flexible DDM infrastructure provided by the DDM service provider include: ability to use multiple types of hardware that can be customized programmatically, push-button simplicity for operators that do not need to be experts on operating robots (e.g., flying drones), minimal training requirement for operators to begin operations, real-time processing for expedited results (e.g., performed at a cloud processor or on the companion computer 312), ability for user device 302 to interact with the system without having to be in the same location as the asset 106.

Figure 4:
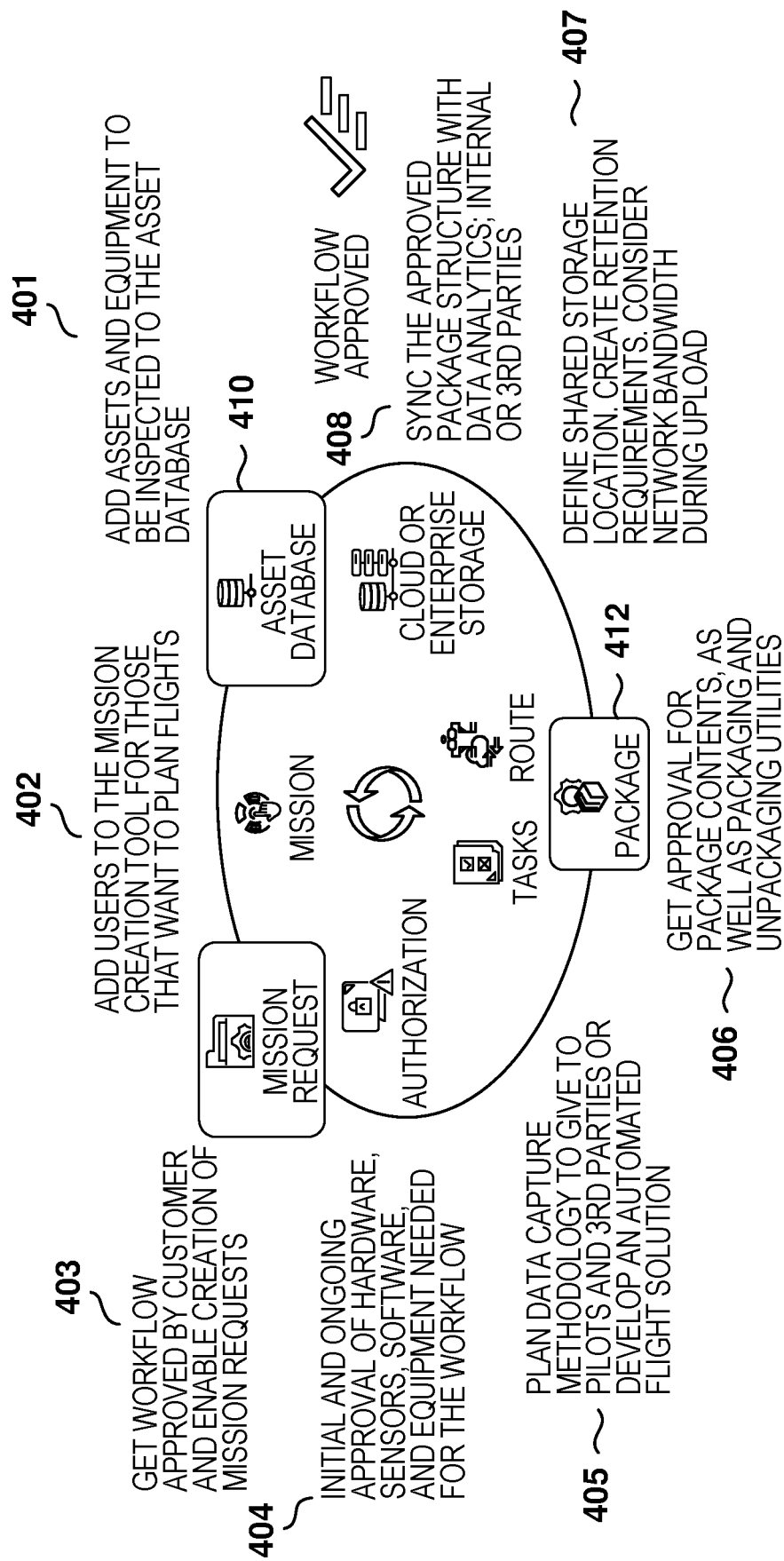
FIG. 4 illustrates the process for approving a mission, according to some example embodiments.

FIG. 4 illustrates the process for approving a mission, according to some example embodiments. Initially, the asset database 410 is populated 401 with information about the assets (e.g., turbines, nuclear plants, power lines, office building, etc.) and equipment available for the inspections (e.g., different models of grounds, self-driving vehicles, robots).

Each asset is associated with an asset identifier and the information about the asset may be retrieved from the asset database 410. In some example embodiments, a hierarchy is defined for the assets, such that assets may be group according to a criterion, such as location, ownership, building, component of another asset, etc. The hierarchy defines the logical grouping of assets, and the asset identifier (e.g., a text string, one or more numerical values) may include the position of the asset within the hierarchy. The asset identifier describes the location of the asset within the functional hierarchy.

Each asset is associated with an asset type that defines the kind of asset it is, e.g., wind turbines, solar panels, oil tanks, power lines, etc. A data collection routine is defined for each asset type, and the data collection routine describes how the data is to be collected during a mission, e.g., sensor type, sensor measurement, conditions for capturing the data, parameters for the particular asset, etc.

The data collection routine is customizable and includes parameters and rules for collecting the data. In some example embodiments, the data collection routine includes one or more of flight characteristics, gimbal control, sensor calibration, and sensor positioning, but other embodiments may include additional data collection parameters.

The versatile data collections routines enable the system to quickly add new assets to the database and the definition of how these assets will be inspected. Otherwise, manually configuring the collection mechanism for each asset is costly and time consuming.

In operation 402, users are added to the system, where the users are able to access the tool for creating new missions. Further, in operation 403, the generated workflows go through the approval process, and when approved, the workflows are added to the mission-creation tool, which enables users to create mission requests.

In operation 404, the hardware and software components associated with the missions are configured, tested, and added to the system, with the corresponding ongoing maintenance of the equipment to guarantee proper operation.

The operation 405, the data-capture methodology is planned in order to program the missions to gather the required data. This way, operators and third parties are able to develop their own interfaces for automated flight solutions.

In operation 406, approval is obtained for the contents of the package 412 that will be generated by the mission, as well as the packing and unpacking utilities to pack or unpack the data. The package 412 may include the asset identifiers of one or more assets associated with the mission. Additionally, the package 412 may include the data collection routine for the asset and the data collection parameters specific to the mission. Thus, when the results are analyzed after the mission is complete, the analysis program has access to the particulars on the data collected and how it was collected.

Thus, the packet may not include all the information about the asset, but the information may be retrieved from the asset database 410 as needed.

Further, the storage management is defined at operation 407, which includes the data structures for storing the data as well as retention guidelines for the data.

In operation 408, the approved package structure is made available to appropriate tools that interface with the system, where the tools may be owned by the business unit or developed by the DDM service provider. Since the package is self-contained, includes all the information about the asset (e.g., asset identifier for the asset database to retrieve all the asset information), and includes how the data collection took place (e.g., route, GPS locations, etc.), the data analysis creates, in some embodiments, a digital twin of the asset for further analysis and recommendations.

A digital twin is a virtual representation of an object or system that spans its lifecycle, is updated from real-time data, and uses simulation, machine learning and reasoning to help decision-making. For example, the digital twin may be used with machine learning to make predictions about the asset, e.g., probability that the asset will malfunction within 12 months.

It is noted that the embodiments illustrated in FIG. 4 are examples and do not describe every possible embodiment. Other embodiments may utilize different operations, combine operations, fewer operations, additional operations, etc. The embodiments illustrated in FIG. 4 should therefore not be interpreted to be exclusive or limiting, but rather illustrative.

Figure 5:
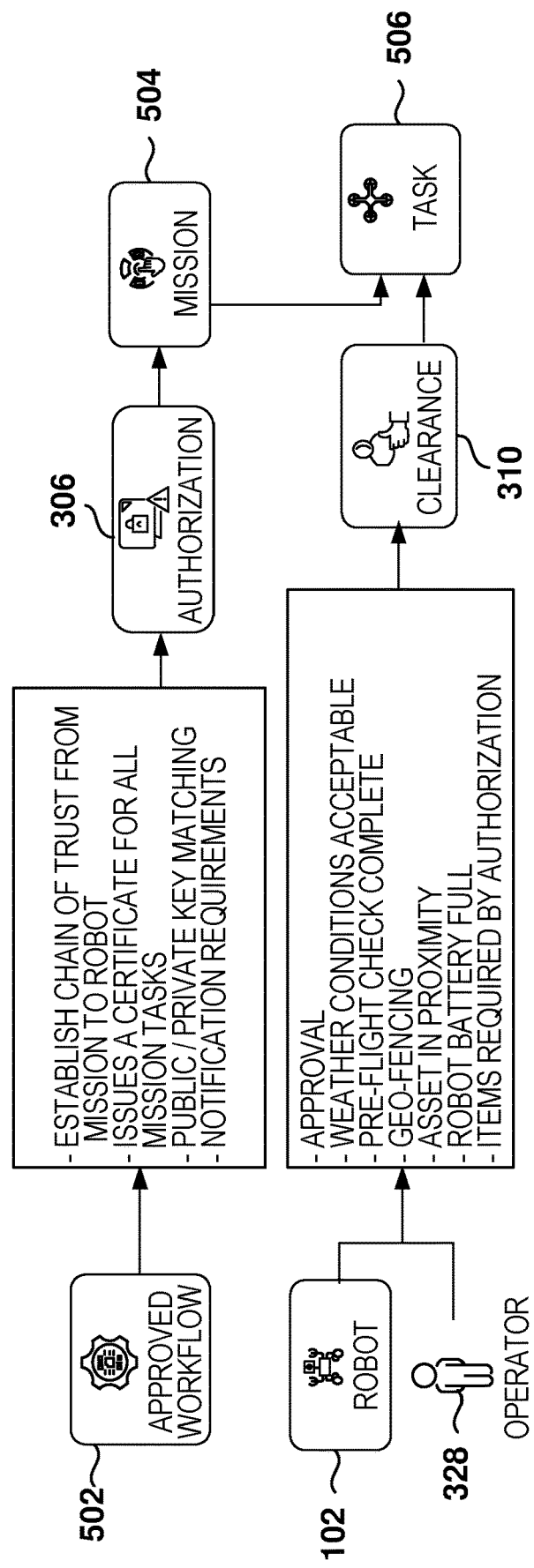
FIG. 5 is a diagram illustrating the authorization process, according to some example embodiments

FIG. 5 illustrates the authorization process, according to some example embodiments. As described above, authorization is required to conduct a mission, and clearance is required to launch one or more actions associated with the mission.

The approval workflow 502 includes the following: establishing a chain of trust from the mission to the robot; issuing a certificate for each task of the mission; check the public and private keys used for data encryption and communication; and establish the notification requirements for the progress of the mission.

Further, conditions are checked before clearance 310 is given to start the one or more tasks. The conditions include approvals to fly the drone, weather conditions are acceptable, the pre-flight check is complete, the task complies with geo-fencing parameters, the robot is in proximity of the asset, the robot battery is full, and other items that may be required based on the authorization 306. Once authorization 306 and clearance 310 are available, the mission begins, which includes one or more tasks 506.

FIG. 6 illustrates the process for requesting a mission, according to some example embodiments. In the illustrated example, the user device 302 generates a mission request 204, and the mission includes two workflows 602 and 603. The workflow, such as example workflow 602 or example workflow 603, is a full end-to-end lifecycle from mission request to derived output (e.g., data analysis results).

For example, a mission may be to inspect a turbine, but some turbines are so big (e.g., 300 m high), that the whole turbine may not be inspected in one pass, so two different workflows are launched to complete the inspection, each workflow inspecting a part of the turbine.

The workflows then generate the mission request 204 sent to the field that generates tasks 506 for the two workflows 602 and 603. After the tasks are performed, the data package 604 is routed 606 to the corresponding location for saving the data, and data analysis 608 may then be performed on the saved data. In some example embodiments, the asset information is downloaded at the inspection site from the asset database. In other example embodiments, the information required to perform the mission is included in the mission request 204 and no access to the access database is required at the inspection site.

In some example embodiments, data analysis includes retrieving the asset information from the asset database based on the asset identifiers contained in the package 604. In other example embodiments, the asset information is added to the package 604 before the package is routed for data analysis.

Figure 7:
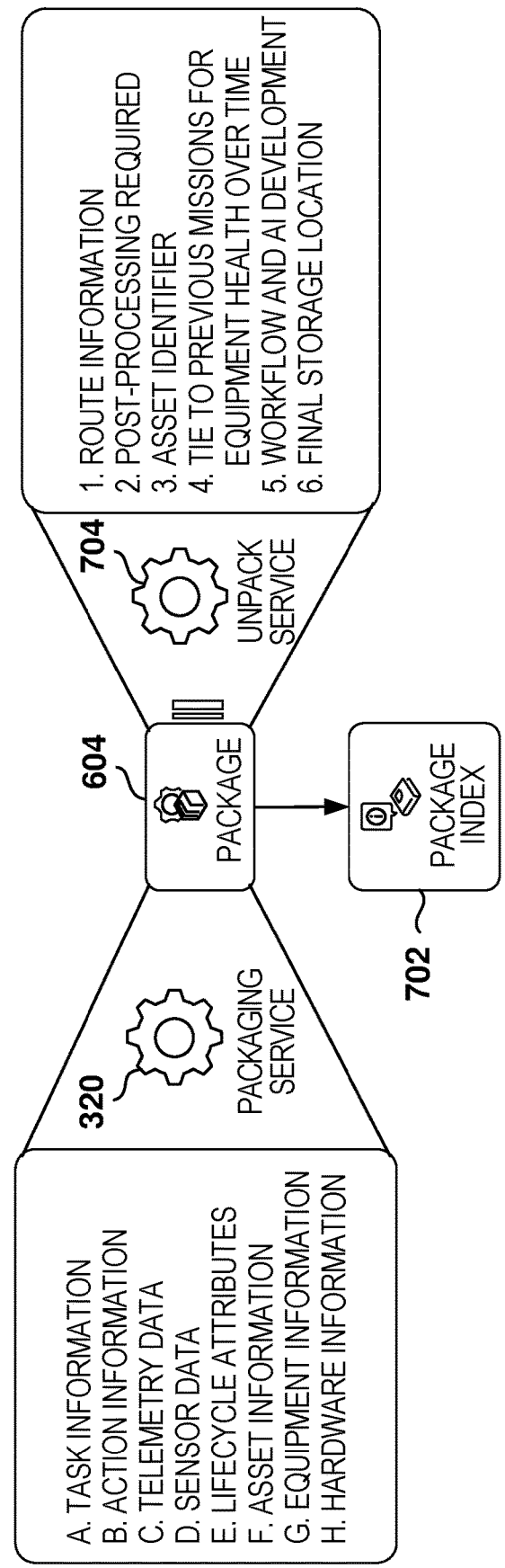
FIG. 7 is a diagram illustrating the creation of packages associated with missions, according to some example embodiments.

FIG. 7 illustrates the creation of packages associated with missions, according to some example embodiments. Packages are data objects with a predefined data format. In some example embodiments, the package 604 are indexed, self-describing, standalone, have a fixed structure, have a flexible size, and are defined specifically for the mission associated with the package 604.

The packaging service 320 takes as input the following: task information, action information, telemetry data, sensor data, lifecycle attributes, asset information, equipment information (e.g., drone used to perform the mission), and hardware information (e.g., type and version of the companion computer).

The packaging service 320 generates the package 604, which is indexed by a package indexer 702 to facilitate quick searches of the package data.

When a program requires access to the package 604, the data is unpacked by the unpack service 704, e.g., obtaining route information, performing post-processing of the data, identifying the asset identifier, relationship with other performance missions, workflows for development of ML models, and storage location.

Figure 8:
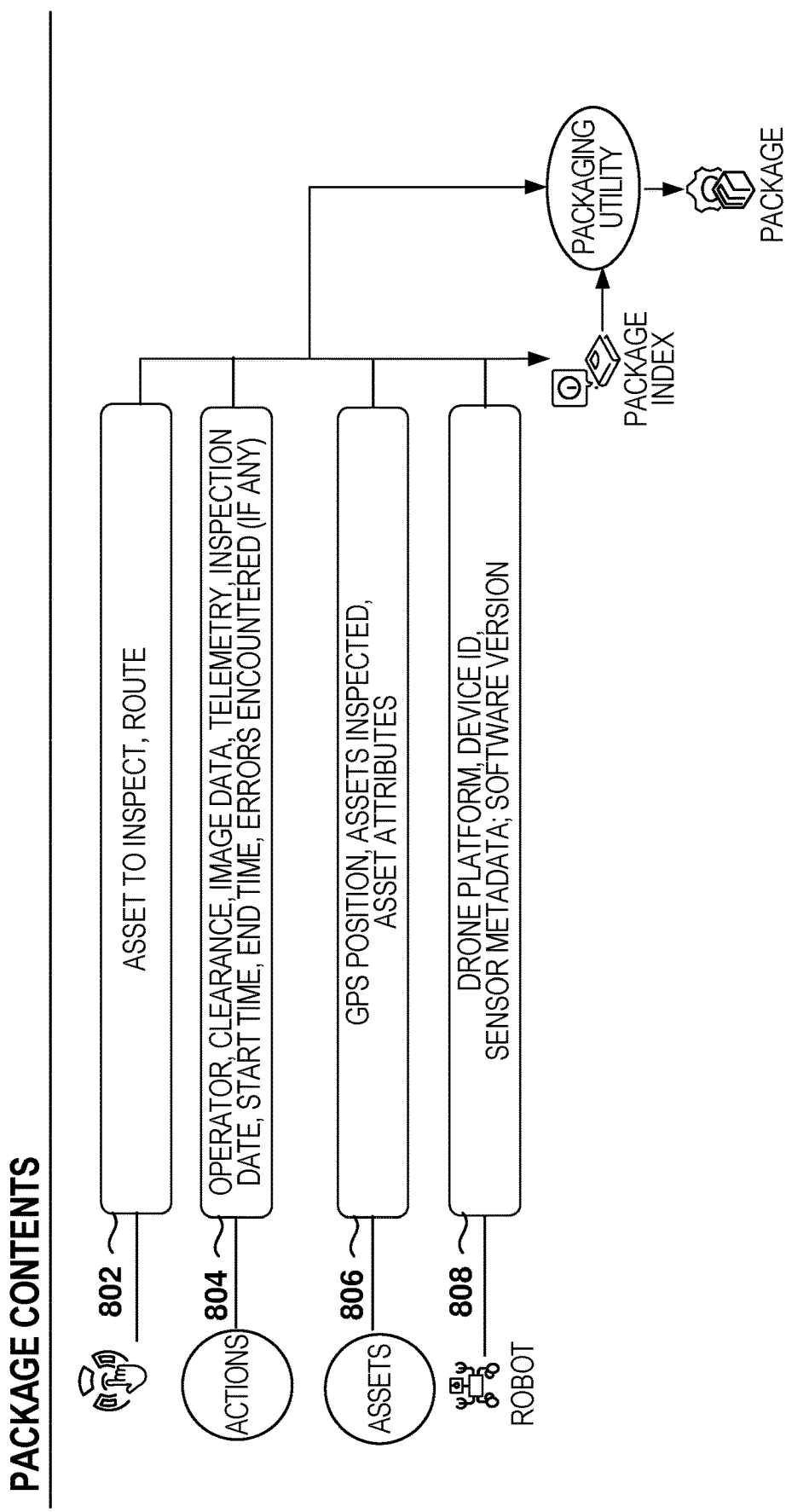
FIG. 8 is a diagram detailing the content of a package, according to some example environments.

FIG. 8 details the contents of a package, according to some example embodiments. In some example embodiments, the package includes mission data 802, action data 804, asset data 806, and robot data 808.

The mission data 802 includes the asset to inspect (e.g., asset identifier), which is a description (e.g., a string, one or more numerical valued) of the location of the asset within the functional hierarchy, and route data.

The action data 804 includes information about operator, clearance, image data, telemetry, inspection date, start time, end time, errors encountered, etc. The action data 804 may be used to implement geo-fencing parameters and limit the geographical areas where the robot may operate.

The asset data 806 includes GPS position, assets inspected, and asset attributes, which is data associated with a specific asset and equipment inspected (e.g., blade length, tower height, line voltage).

The robot data 808 includes the hardware for the drone platform, the device identifier (ID), sensor metadata (information about the sensors used), and software version.

In some example embodiments, the package is defined by a JavaScript Object Notation (JSON) data structure and includes the following fields:

```
> device:       {...}
> flight        {...}
> package       {...}
> payload       {...}
```

The device field includes the identifier of the robot and the version, such as the following:

```
>device:
    id:       0ef74a83-47f0-4cae-ac0d-ea9a9cd7e272
    version:  0.1.0
```

The flight field identifies data about the flight, such as flight path, date, altitude, etc. Below is an example for inspecting the roof of a house:

```
>flight:
  landed_utc_ts: 194515814,
  >notes:          MAR29_trial11\r\nHouse:41\r\nLidar
  house_id:        4b733926-1a29-43b0-9e48-539c1aeb0277
  flytbase_data_path: /var/diri/flights/mission_logs/142615029
  test_mission: 0
  scanned_roof_position: [-8.0, 127.0, -115.0]
  flytbase_id: 1732515029
  ...
  >flytbase_launch_configs:
    >asset_config:
        north:
              alt:   896.0
              lat:   48.166395151
              long:  -98.8881529
        south:
              alt:   894.0
              lat:   48.1663911
              long:  -98.8881547
        east:
              alt:   895.0
              lat:   48.1663942
              long:  -98.8881564
        west:
              alt:   895.0
              lat:   48.1663900
              long:  -98.8881600,
    >drone_config:
        fsnc:
              efs:   true
              fscd:  2.0
              fstm:  0.8
    >mission_config:
        route:
              0:     "AB"
              1:     "CD"
              2:     "EF"
              3:     "GH"
```

The package field identifies the payload type, such as:

```
> package:
    payload_type:  house-roof-inspection-flight
```

The payload field includes sensor data, such as:

```
payload:
  meta:
      has_extra_images:       false,
      has_extra_image_log:    false,
      is_full_match:          true,
      missing_images:         [ ],
  data:
      0001.jpg:
              timestamp:   2020-03-29T20:52:31,
              latitude:    48.1664803381,
              longitude:   -98.8879708675,
              side:        N
              panned:      0
              rotated:     0
      0002.jpg:
              timestamp:   2020-03-29T20:52:35
              latitude:    48.166480083
              longitude:   -98.8879771391
              side:        S
              panned:      0
              rotated:     0
      0003.jpg:
              timestamp:   2020-03-29T20:52:39
      ...
```

In some example embodiments, the payload field has two fields: metadata and data. The metadata is a place to include any information about the flight routine, whatever is important for that package, e.g., extra images, extra logs, etc.

The data field includes the captured data, such as this image corresponds to this section of this blade, pan, and rotation. This is useful information for the subsequent analysis of the mission.

In some example embodiments, the package content is uploaded to cloud storage. However, sometimes network connectivity is poor or unavailable in some remote sites, so other ways of downloading the package content are possible, such as storing on an SD card for later download, store it on an external memory device, transmit wirelessly to a nearby mobile device or a laptop, etc. Since the package is self-describing, the data may be uploaded at any time from any device.

Figure 9:
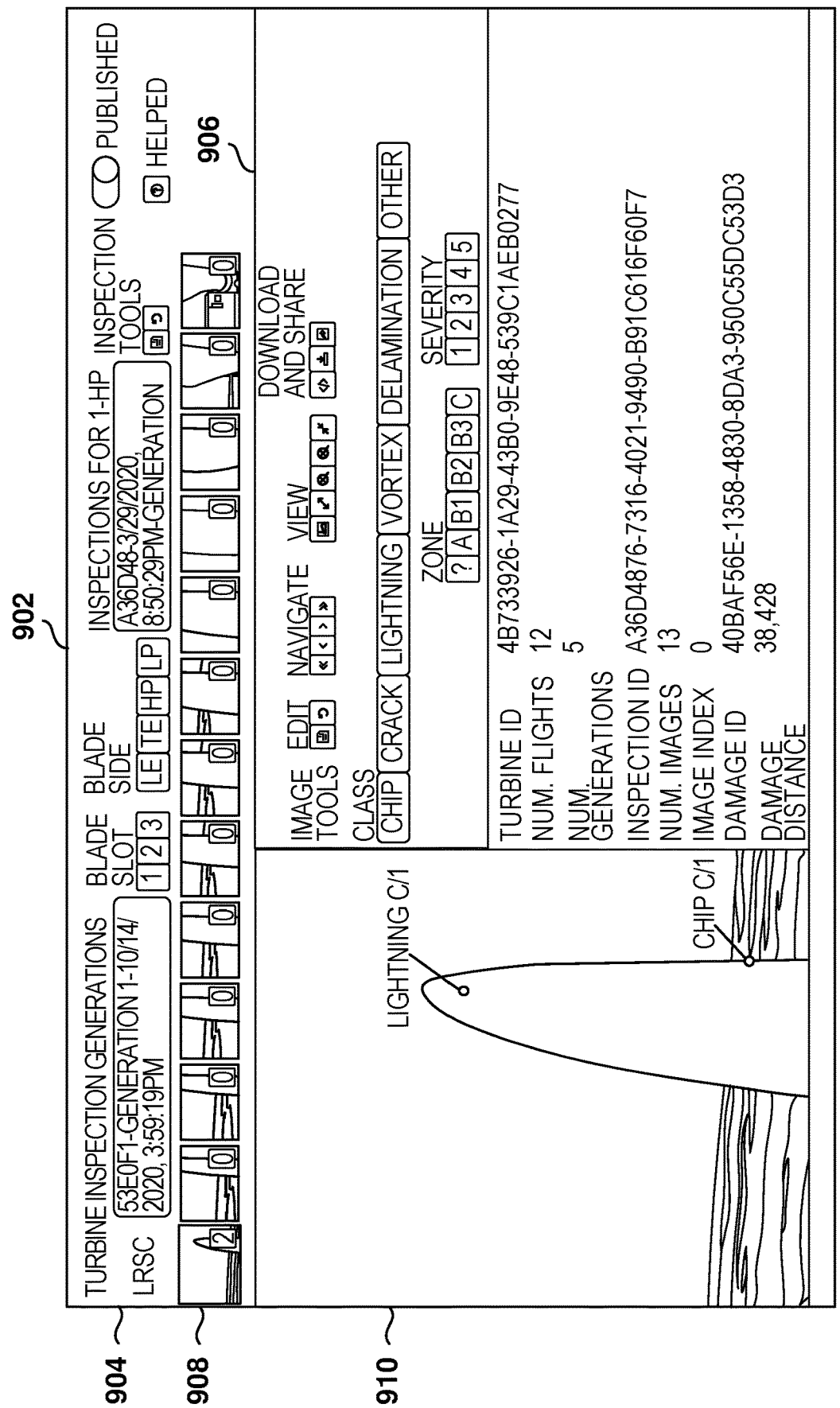
FIG. 9 is a sample user interface (UI) for performing missions and viewing results, according to some example embodiments.

FIG. 9 is a sample user interface (UI) 902 for performing missions and viewing results, according to some example embodiments. The UI 902 includes a parameter selection area 904, an information area 906, a thumbnail area 908, and an image area 910.

The parameter selection area 904 includes options for selecting the mission, the blade, the blade side, inspection generation, and other tools.

The information area 906 includes other tools, such as image viewing tools, downloading tools, damage reports, turbine information, etc. One of the options in the information area 906 is to provide an option to label the data so it can be used for ML training, such as this particular image shows damage on the blade.

The thumbnail area 908, includes a list of thumbnails taken during the mission and selecting a thumbnail results in showing the corresponding image in the image area 910.

Thus, the UI 902 provides the information required to understand the mission, how it was executed, what data was captured, and what is the result of the analysis of the captured data.

Figure 10:
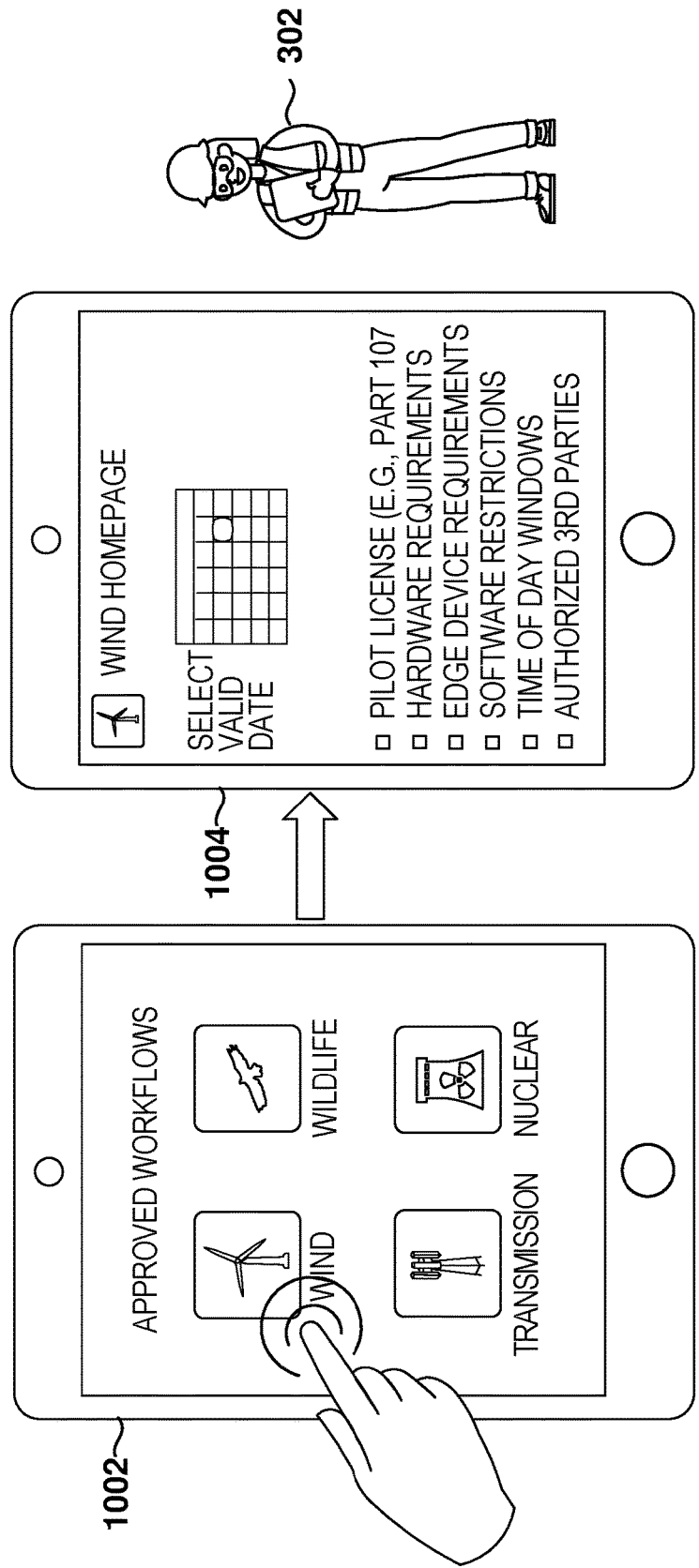
FIG. 10 illustrates the interface for initiating a mission, according to some example embodiments.

FIG. 10 illustrates the UI 1002 for initiating a mission, according to some example embodiments. In the illustrated example, the UI 1002 includes options to select different types of workflows that have already been approved. In this example, there are workflows for wind inspections (wind turbines), wildlife inspections, transmission cable inspections, and nuclear plant inspections.

Once the operator 302 selects an approved workflow (e.g., inspecting a wind turbine in the illustrated example), the UI 1004 is presented with the parameters set for the selected workflow, such as requiring pilot license for the operator, hardware requirements for the mission, requirements for the edge devices, requirements for software configuration, requirements for scheduling, requirements for authorized third parties, geo-fencing requirements, etc.

The operator 302 in the field can then prepare the hardware for the mission and activate the mission when everything is ready. The operator 302 may select to execute the mission right away or select a date for executing the mission. Once the mission starts, the corresponding workflow is executed.

Figure 11:
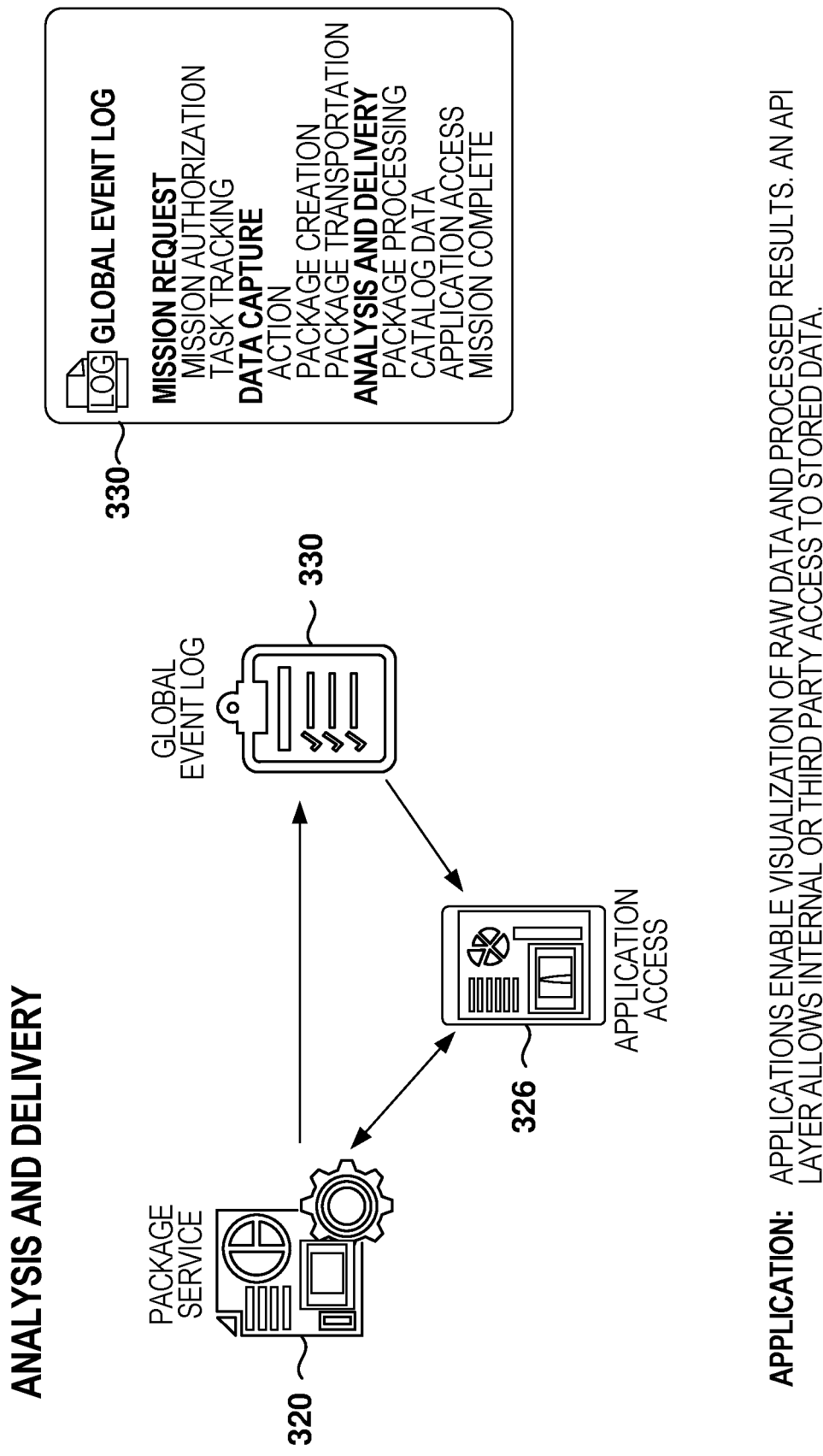
FIG. 11 illustrates the process for analyzing and delivering data associated with missions, according to some example embodiments.

FIG. 11 illustrates the process for analyzing and delivering data associated with missions, according to some example embodiments. The global event log 330 includes information on mission request (authorization, task tracking), data capture (actions, packages, package transportation), analysis and delivery (package processing, catalog data, application access), and indication if the mission has been completed.

The application 326 enables visualization of the data and the process results, such as the UI 902 in FIG. 9. An API also provides programmatic access to the data in the global event log 330.

Figure 12:
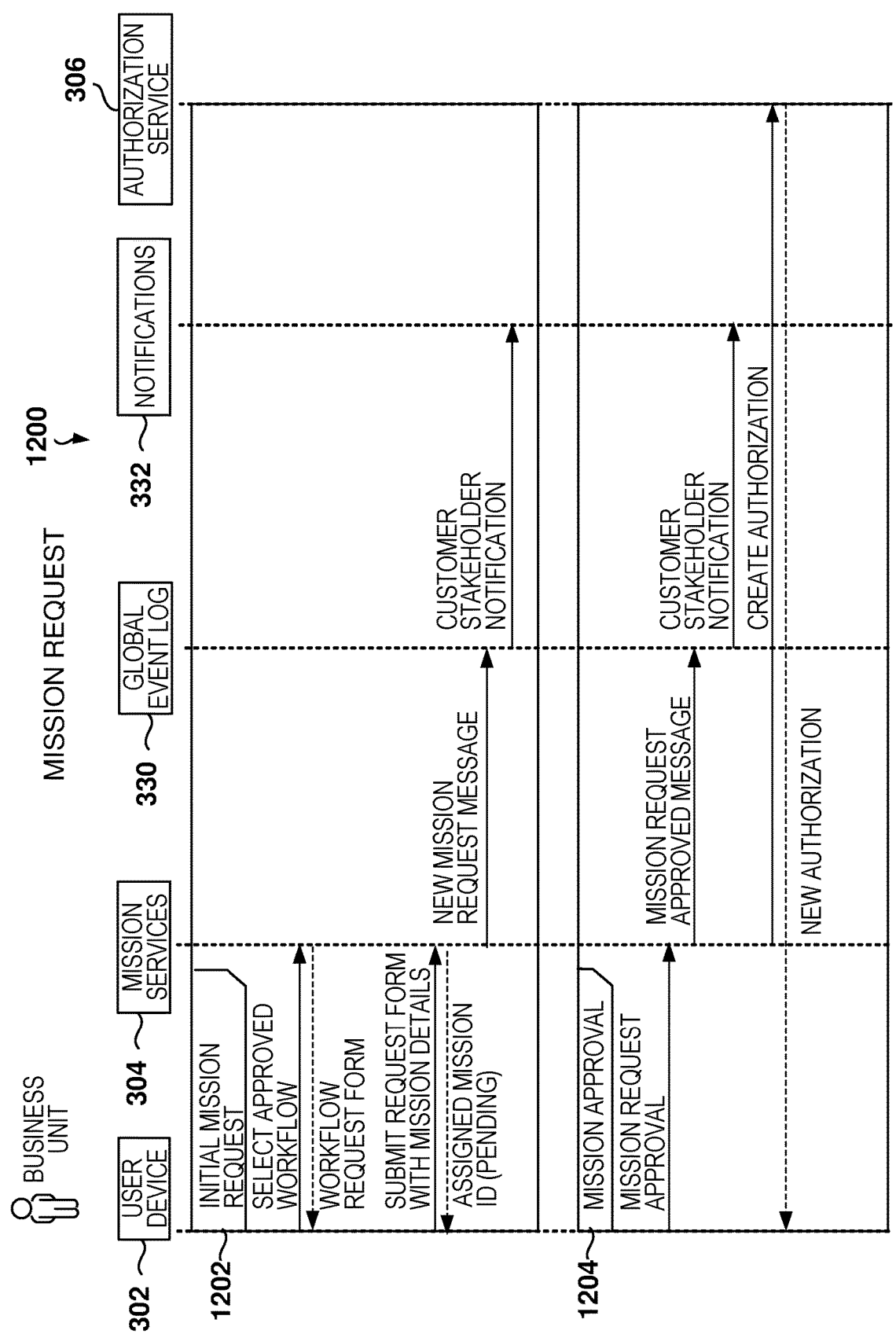
FIG. 12 is a swim chart detailing the interactions for requesting a mission, according to some example embodiments.

FIG. 12 is a swim chart 1200 detailing the interactions for requesting a mission, according to some example embodiments. There are two operations in swim chart 1200: the initial mission request 1202 and the mission approval 1204.

During the initial mission request 1202, the user selects in the user device 302 one of the approved workflows from mission services 304, and mission services 304 returns the workflow request form to the user device 302.

The user device 302 then submits the request form with the mission details to mission services 304, and the mission services 304 creates the mission, assigns a mission ID, and returns the assigned mission ID to the user device 302. Further, mission services 304 sends the new mission request message to the global event log 330, and the global event log 330 opens a new entry for the new mission with the associated mission ID. Additionally, the global event log 330 sends a customer stakeholder notification to the notification services 332 to the user device 302 (not shown) or the DDM system (not shown).

During the mission approval 1204, the user device 302 sends a mission request approval to mission services 304, which forwards a mission request approved message to the global event log 330. Mission services 304 also sends a create-authorization message to the authorization service 306.

The global event log 330 sends a customer stakeholder notification to the notification services 332. Further, the authorization service 306 sends a confirmation of the new authorization to the user device 302.

Figure 13:
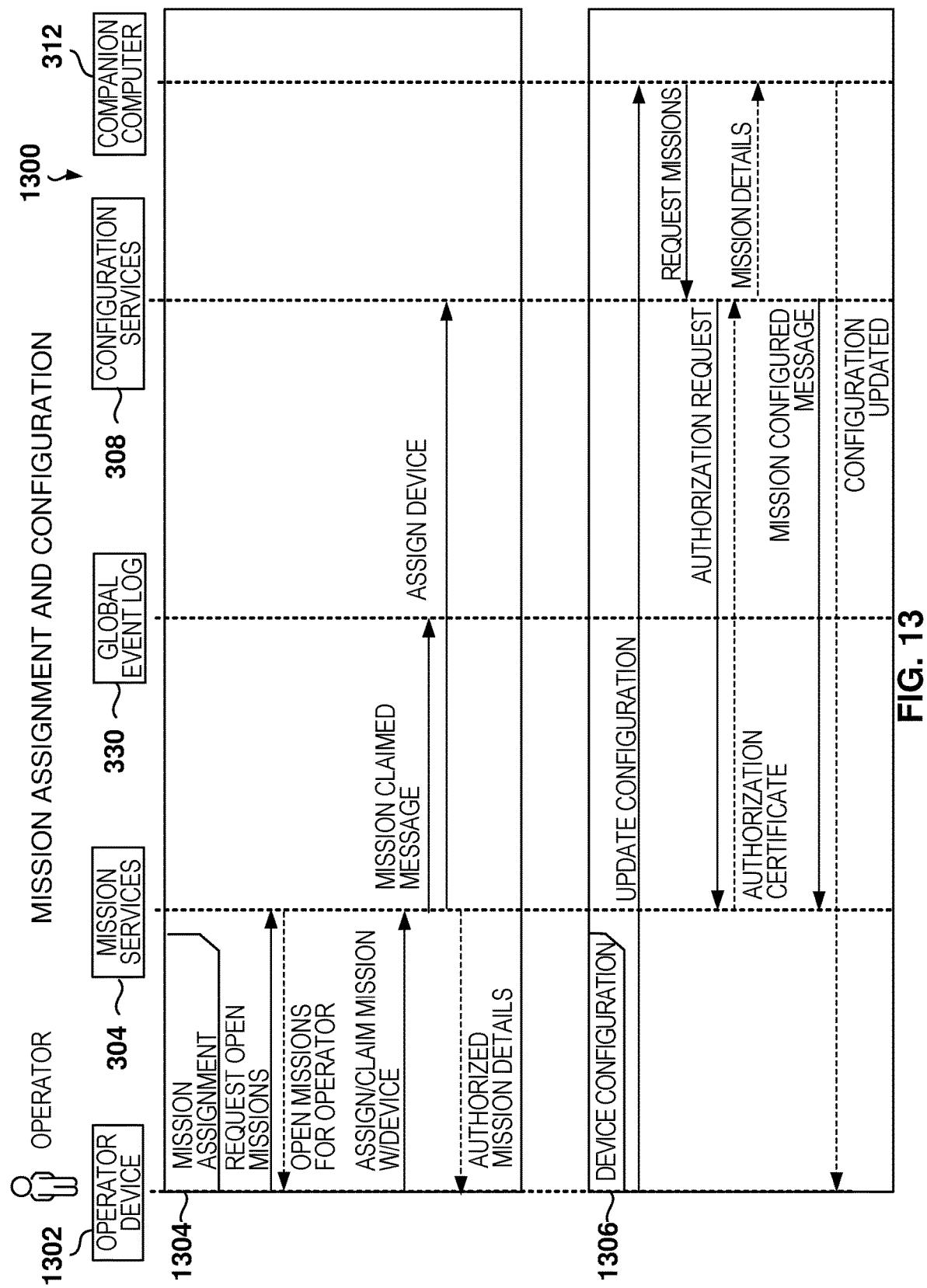
FIG. 13 is a swim chart detailing the interactions for mission assignment and configuration of the mission, according to some example embodiments.

FIG. 13 is a swim chart 1300 detailing the interactions for mission assignment and configuration of the mission, according to some example embodiments. There are two operations in swim chart 1300: the mission assignment 1304 and the device configuration 1306.

During the mission assignment 1304, the operator device sends, to mission services 304, a request to open a mission. Mission services 304 opens the mission and then sends a confirmation request to the operator device 1302.

Further, the operator device 1302 sends a message to mission services 304 assigned the mission to a device. Mission services sends a mission-claimed message to the global event log 330, and an assign-device message to configuration services 308 to configure the mission for the assigned device. Further, mission services 304 sends an authorized-mission message to the operator device 1302 with details of the mission.

During the device configuration 1306, the operator device 1302 sends an update-configuration message to the companion computer 312 on a robot that will execute the mission. The companion computer 312 then sends a request-mission message to configuration services 308.

The configuration services 308 sends an authorization-request message to mission services 304, and mission services 304 responds with an authorization certificate.

The configuration services 308 sends a message with the mission details to the companion computer 312, and another message to the mission services 304 indicating that the mission has been configured.

The companion computer 312 sends a configuration-updated message to the operator device 1302. The operator device 1302 is then ready to execute the mission, and no longer needs an active internet connection to perform the assigned tasks.

Figure 14:
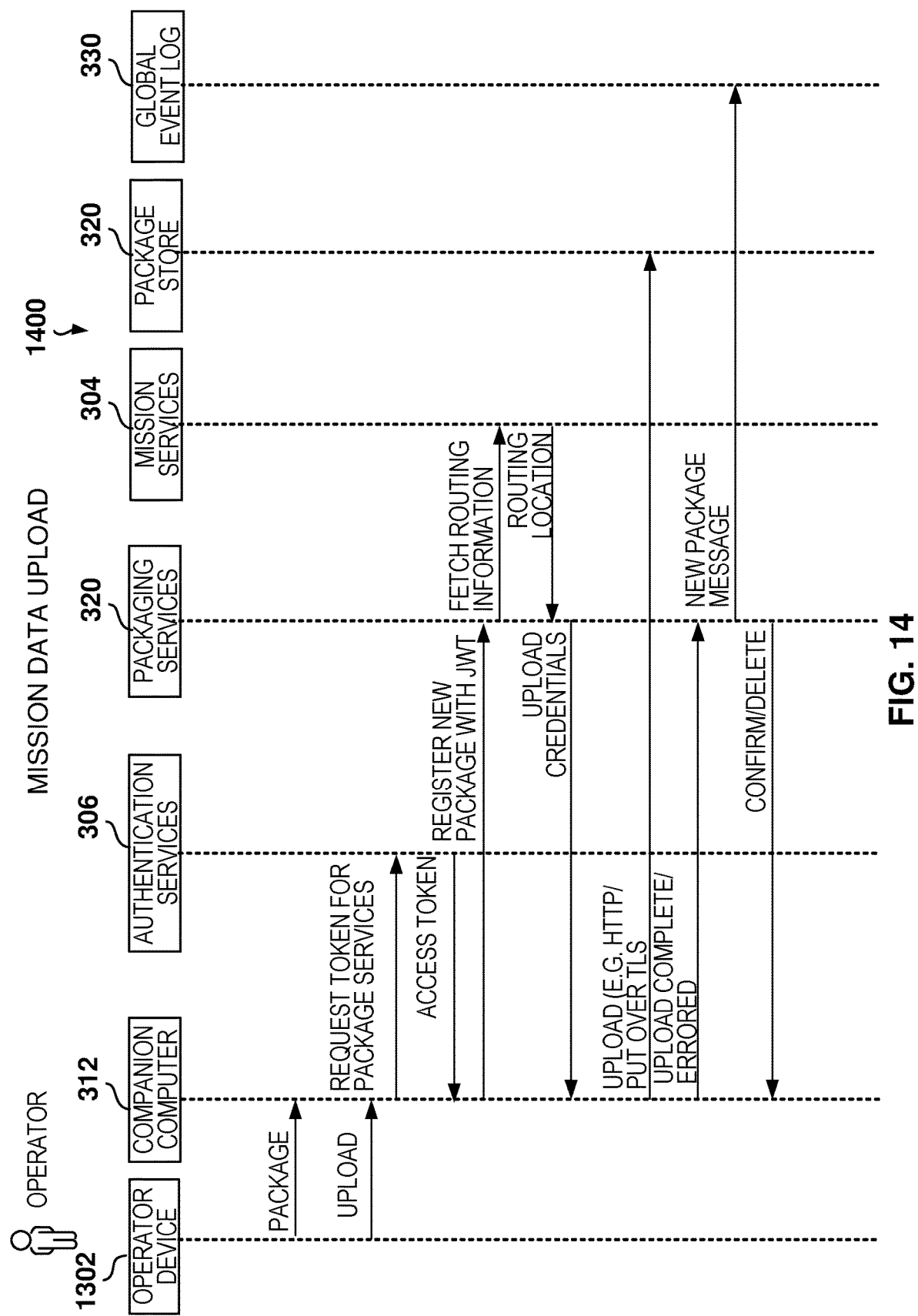
FIG. 14 is a swim chart detailing the interactions for uploading mission data, according to some example embodiments.

FIG. 14 is a swim chart 1400 detailing the interactions for uploading mission data, according to some example embodiments. The operator device 1302 sends the mission package to the companion computer 312 and uploads the required information for the mission.

The companion computer 312 sends a request token for package services to authentication services 306, with responds with the access token.

The companion computer 312 that registers the new packets with packaging services 320, and packaging services 320 sends a message, to fetch routing information, to mission services 304, which responds with the routing location.

The package service 320 uploads the credentials to the companion computer 312. Further, the companion computer 312 uploads the mission data to package store 320.

The companion computer 312 sends a message that the update was completed, or that there was an error, two package services 320. If the update is completed, package services 320 sends the new package to the global event log 330. Further, package services 320 sends a confirmation to the companion computer 312 that the mission data has been uploaded, or a message to delete the mission if there was an error.

Figure 15:
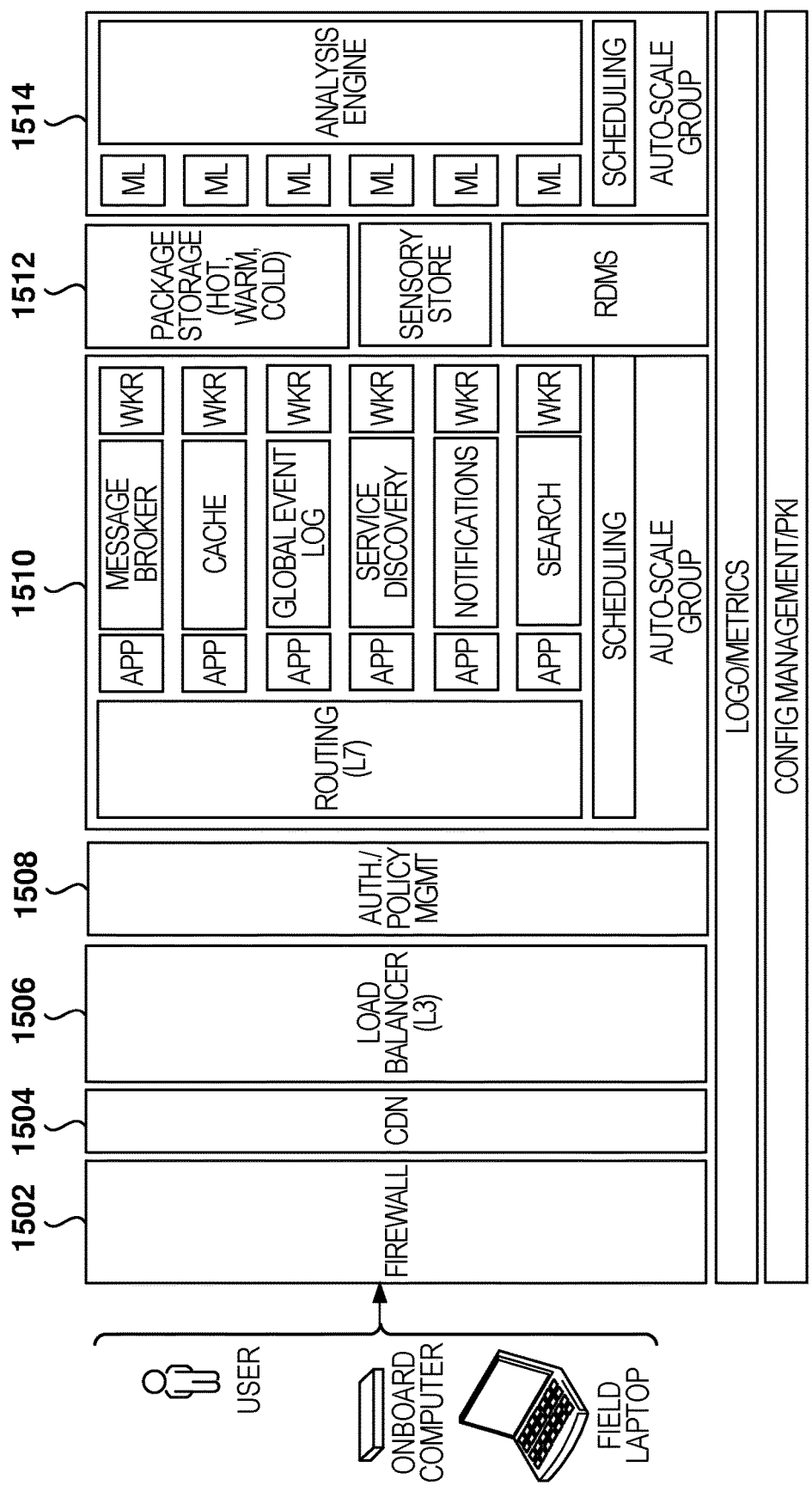
FIG. 15 is a sample architecture of a system for implementing embodiments.

FIG. 15 is a sample architecture of a system for implementing embodiments. A firewall 1502 is used to control access from user devices to a content delivery network (CDN) 1504. A load balancer 1506 is used for managing loads in a distributed system. Further, an authentication/policy management module 1508 controls user authentications for accessing the system and access to missions.

A plurality of devices operate in an auto-scale group 1510 that includes routing for data, a plurality of applications, several DDM program modules, and multiple worker virtual machines. The DDM program modules include a message broker, a cache, the global event log, a service-discovery module, notifications module, the search model, and a scheduler.

A plurality of databases 1512 store the mission and user data. Further, group 1514 includes a plurality of ML models for data analysis and an analysis engine that coordinates activities of the ML models.

Figure 16:
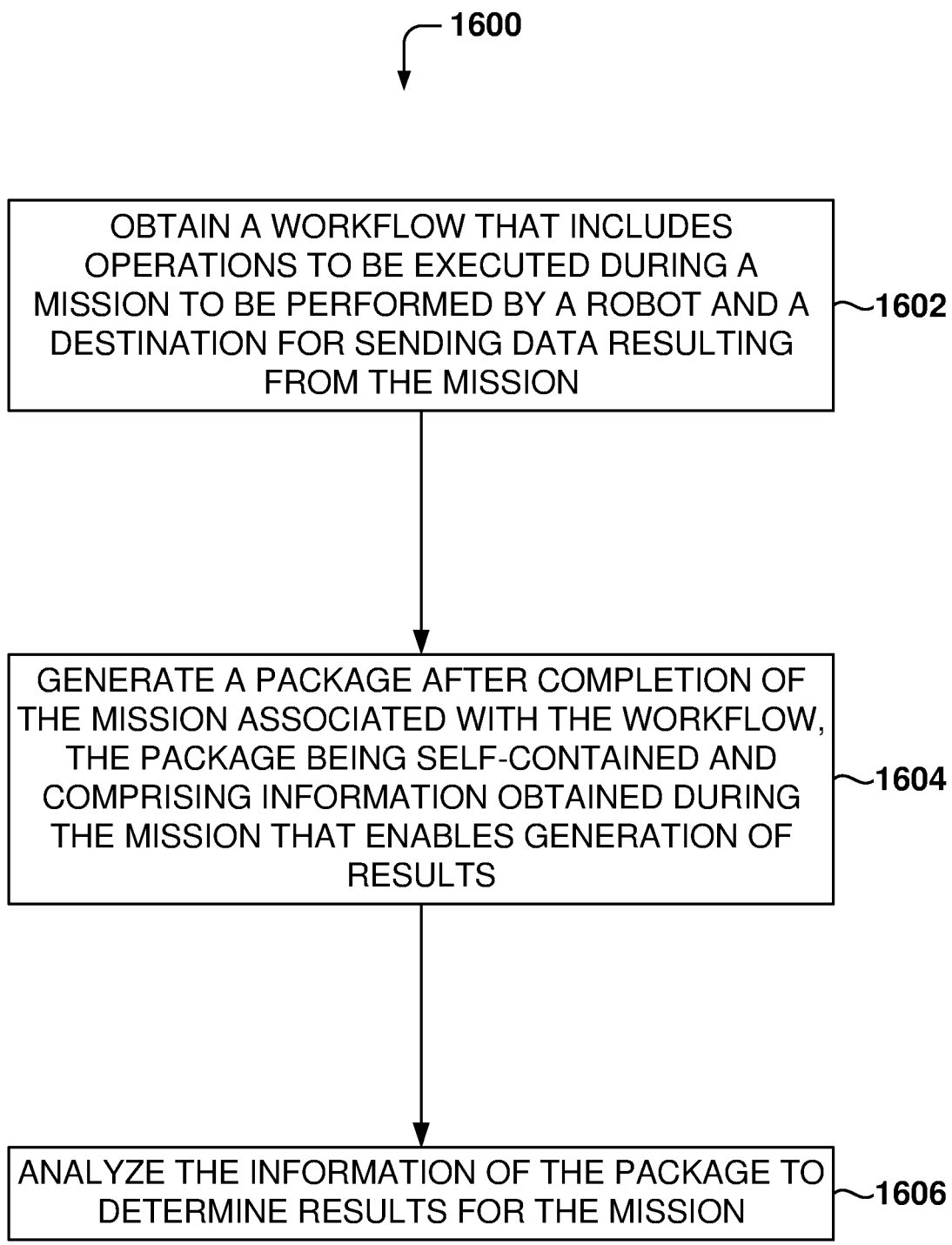
FIG. 16 is a flowchart of a method for executing a mission by an autonomous device to inspect an asset, according to some example embodiments.

FIG. 16 is if flowchart of a method 1600 for executing a mission by an autonomous device to inspect an asset, according to some example embodiments. While the various operations in this flowchart are presented and described sequentially, one of ordinary skill will appreciate that some or all of the operations may be executed in a different order, be combined or omitted, or be executed in parallel.

Operation 1602 is for obtaining a workflow that includes operations to be executed during a mission to be performed by a robot and a destination for sending data resulting from the mission.

From operation 1602, the method 1600 flows to operation 1604 for generating a package after completion of the mission associated with the workflow. The package is self-contained and comprising information obtained during the mission that enables generation of results, the package comprising: sensor information collected by one or more sensors; telemetry information obtained by the robot; information about assets associated with the mission; software version identifier for the package generation; and routing information for transmitting the package to the destination.

From operation 1604, the method 1600 flows to operation 1606 for analyzing the information of the package to determine results for the mission.

In one example, the method 1600 further comprises providing an application programming interface (API) that includes a command for sending a request to perform the mission.

In one example, the package further comprises: information about equipment executing the mission; a description of a functional hierarchy of the assets; and date, start time, and end time of an inspection.

In one example, the method 1600 further comprises causing presentation on a user interface of mission information and the results of the mission.

In one example, the method 1600 further comprises configuring, by a configuration-services module, a mission request based on equipment to be used to perform the mission.

In one example, the method 1600 further comprises sending the workflow from the configuration-services module to a companion computer installed in the robot.

In one example, the method 1600 further comprises creating an entry for the mission in a global event log, and storing the package in the global event log after the completion of the mission.

In one example, the method 1600 further comprises sending a command to perform the mission to a companion computer on the robot. The companion computer provides instructions to the robot while the mission is executed, In one example, performing the mission includes traveling, by the robot, to locations of one or more assets; and collecting the sensor information associated with the one or more assets.

In one example, the method 1600 further comprises formatting, by a catalog service, the package based on the workflow; and storing, by the catalog service, the formatted package that is ready for the analysis.

Another general aspect is for a system that includes a memory comprising instructions and one or more computer processors. The instructions, when executed by the one or more computer processors, cause the system to perform operations comprising: obtaining a workflow, the workflow including operations to be executed during a mission to be performed by a robot and a destination for sending data resulting from the mission; generating a package after completion of the mission associated with the workflow, the package being self-contained and comprising information obtained during the mission that enables generation of results, the package comprising: sensor information collected by one or more sensors; telemetry information obtained by the robot; information about assets associated with the mission; software version identifier for the package generation; and routing information for transmitting the package to the destination; and analyzing the information of the package to determine results for the mission.

In yet another general aspect, a machine-readable storage medium (e.g., a non-transitory storage medium) includes instructions that, when executed by a machine, cause the machine to perform operations comprising: obtaining a workflow, the workflow including operations to be executed during a mission to be performed by a robot and a destination for sending data resulting from the mission; generating a package after completion of the mission associated with the workflow, the package being self-contained and comprising information obtained during the mission that enables generation of results, the package comprising: sensor information collected by one or more sensors; telemetry information obtained by the robot; information about assets associated with the mission; software version identifier for the package generation; and routing information for transmitting the package to the destination; and analyzing the information of the package to determine results for the mission.

In view of the disclosure above, various examples are set forth below. It should be noted that one or more features of an example, taken in isolation or combination, should be considered within the disclosure of this application.

Figure 17:
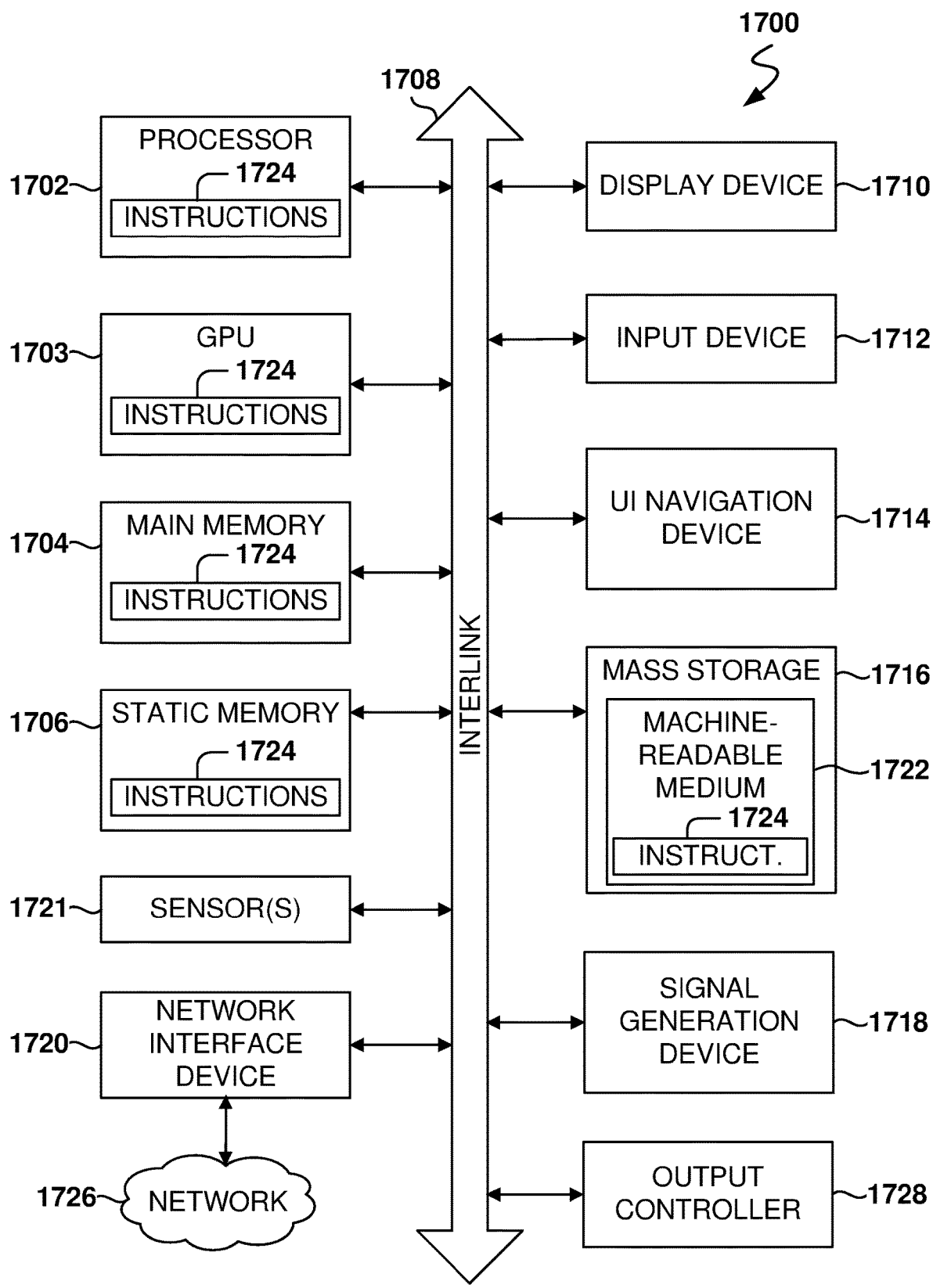
FIG. 17 is a block diagram illustrating an example of a machine upon or by which one or more example process embodiments described herein may be implemented or controlled.

FIG. 17 is a block diagram illustrating an example of a machine 1700 upon or by which one or more example process embodiments described herein may be implemented or controlled. In alternative embodiments, the machine 1700 may operate as a standalone device or may be connected (e.g., networked) to other machines. In a networked deployment, the machine 1700 may operate in the capacity of a server machine, a client machine, or both in server-client network environments. In an example, the machine 1700 may act as a peer machine in a peer-to-peer (P2P) (or other distributed) network environment. Further, while only a single machine 1700 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, a number of components, or mechanisms. Circuitry is a collection of circuits implemented in tangible entities that include hardware (e.g., simple circuits, gates, logic). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits) including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 1700 may include a hardware processor 1702 (e.g., a central processing unit (CPU), a hardware processor core, or any combination thereof), a graphics processing unit (GPU) 1703, a main memory 1704, and a static memory 1706, some or all of which may communicate with each other via an interlink (e.g., bus) 1708. The machine 1700 may further include a display device 1710, an alphanumeric input device 1712 (e.g., a keyboard), and a user interface (UI) navigation device 1714 (e.g., a mouse). In an example, the display device 1710, alphanumeric input device 1712, and UI navigation device 1714 may be a touch screen display. The machine 1700 may additionally include a mass storage device (e.g., drive unit) 1716, a signal generation device 1718 (e.g., a speaker), a network interface device 1720, and one or more sensors 1721, such as a Global Positioning System (GPS) sensor, compass, accelerometer, or another sensor. The machine 1700 may include an output controller 1728, such as a serial (e.g., universal serial bus (USB)), parallel, or other wired or wireless (e.g., infrared (IR), near field communication (NFC)) connection to communicate with or control one or more peripheral devices (e.g., a printer, card reader).

The mass storage device 1716 may include a machine-readable medium 1722 on which is stored one or more sets of data structures or instructions 1724 (e.g., software) embodying or utilized by any one or more of the techniques or functions described herein. The instructions 1724 may also reside, completely or at least partially, within the main memory 1704, within the static memory 1706, within the hardware processor 1702, or within the GPU 1703 during execution thereof by the machine 1700. In an example, one or any combination of the hardware processor 1702, the GPU 1703, the main memory 1704, the static memory 1706, or the mass storage device 1716 may constitute machine-readable media.

While the machine-readable medium 1722 is illustrated as a single medium, the term "machine-readable medium" may include a single medium, or multiple media, (e.g., a centralized or distributed database, and/or associated caches and servers) configured to store the one or more instructions 1724.

The term "machine-readable medium" may include any medium that is capable of storing, encoding, or carrying instructions 1724 for execution by the machine 1700 and that cause the machine 1700 to perform any one or more of the techniques of the present disclosure, or that is capable of storing, encoding, or carrying data structures used by or associated with such instructions 1724. Non-limiting machine-readable medium examples may include solid-state memories, and optical and magnetic media. In an example, a massed machine-readable medium comprises a machine-readable medium 1722 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1724 may further be transmitted or received over a communications network 1726 using a transmission medium via the network interface device 1720.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
performing an approval process for a mission to inspect one or more assets by a robot, the approval process comprising:
establishing a chain of trust from the mission to the robot;
issuing a certificate for each task of the mission;
determining public and private keys for data encryption; and
establishing notification requirements for progress of the mission;
in response to the mission being approved, receiving, by a companion computer in the robot, a workflow, the workflow including operations to inspect the one or more assets during the mission to be performed by the robot;

performing autonomously the mission by the robot based on the workflow, the mission comprising traveling to locations of the one or more assets and collecting sensor information associated with the one or more assets;

generating, by a package generation software executing in the companion computer, a package after completion of the mission, the package being self-contained and comprising information obtained during the mission that enables generation of results, the package generation software having a version identifier;

sending a request, from the companion computer to a mission services computer after completion of the mission, for routing information to transmit the package, the routing information comprising a destination for sending the package;

receiving, by the companion computer, the routing information comprising the destination where to send the package after completion of the mission;

sending, from the companion computer, the package to the destination that is a package storage, wherein the package comprises:
sensor information collected by one or more sensors;
telemetry information obtained by the robot;
information about assets associated with the mission;
the version identifier; and
the routing information; and analyzing the information of the package stored in the package store to determine results for the mission.

2. The method as recited in claim 1, further comprising:
providing an application programming interface (API) that includes a command for sending a request to perform the mission.

3. The method as recited in claim 1, wherein the package further comprises:
information about equipment executing the mission;
a description of a functional hierarchy of the assets; and
date, start time, and end time of the mission.

4. The method as recited in claim 1, further comprising:
causing presentation on a user interface of mission information and the results of the mission.

5. The method as recited in claim 1, further comprising:
configuring, by a configuration-services module, a mission request based on equipment to be used to perform the mission.

6. The method as recited in claim 5, wherein the workflow is sent from the configuration-services module to the companion computer installed in the robot.

7. The method as recited in claim 1, further comprising:
creating an entry for the mission in a global event log.

8. The method as recited in claim 1, wherein the companion computer provides instructions to the robot while the mission is executed.

9. The method as recited in claim 1, wherein performing autonomously the mission includes:
traveling, by the robot, to locations of one or more assets; and
collecting the sensor information associated with the one or more assets.

10. The method as recited in claim 1, further comprising:
formatting, by a catalog service, the package based on the workflow.

11. The method as recited in claim 1, further comprising:
before receiving the workflow, checking, by the companion computer, conditions before clearance to perform the mission, the conditions comprising having mission approval, task complies with geo-fencing parameters, and the robot is in proximity of the one or more assets.

12. A system comprising:
a memory comprising instructions; and
one or more computer processors, wherein the instructions, when executed by the one or more computer processors, cause the system to perform operations comprising:
performing an approval process for a mission to inspect one or more assets by a robot, the approval process comprising:
establishing a chain of trust from the mission to the robot;
issuing a certificate for each task of the mission;
determining public and private keys for data encryption; and
establishing notification requirements for progress of the mission;

in response to the mission being approved, receiving, by a companion computer in the robot, a workflow, the workflow including operations to inspect the one or more assets during the mission to be performed by the robot;

performing autonomously the mission by the robot based on the workflow, the mission comprising traveling to locations of the one or more assets and collecting sensor information associated with the one or more assets;

generating, by a package generation software executing in the companion computer, a package after completion of the mission, the package being self-contained and comprising information obtained during the mission that enables generation of results, the package generation software having a version identifier;

sending a request, from the companion computer to a mission services computer after completion of the mission, for routing information to transmit the package, the routing information comprising a destination for sending the package;

receiving, by the companion computer, the routing information comprising the destination where to send the package after completion of the mission;

sending, from the companion computer, the package to the destination that is a package storage, wherein the package comprises:
sensor information collected by one or more sensors;
telemetry information obtained by the robot;
information about assets associated with the mission;
the version identifier; and
the routing information; and analyzing the information of the package stored in the package store to determine results for the mission.

13. The system as recited in claim 12, wherein the instructions further cause the one or more computer processors to perform operations comprising:
providing an application programming interface (API) that includes a command for sending a request to perform the mission.

14. The system as recited in claim 12, wherein the package further comprises:
information about equipment executing the mission;
a description of a functional hierarchy of the assets; and
date, start time, and end time of the mission.

15. The system as recited in claim 12, wherein the instructions further cause the one or more computer processors to perform operations comprising:

configuring, by a configuration-services module, a mission request based on equipment to be used to perform the mission.

16. A tangible machine-readable storage medium including instructions that, when executed by a machine, cause the machine to perform operations comprising:

performing an approval process for a mission to inspect one or more assets by a robot, the approval process comprising:
  establishing a chain of trust from the mission to the robot;
  issuing a certificate for each task of the mission;
  determining public and private keys for data encryption; and
  establishing notification requirements for progress of the mission;
in response to the mission being approved, receiving, by a companion computer in the robot, a workflow, the workflow including operations to inspect the one or more assets during the mission to be performed by the robot;
performing autonomously the mission by the robot based on the workflow, the mission comprising traveling to locations of the one or more assets and collecting sensor information associated with the one or more assets;
generating, by a package generation software executing in the companion computer, a package after completion of the mission, the package being self-contained and comprising information obtained during the mission that enables generation of results, the package generation software having a version identifier;
sending a request, from the companion computer to a mission services computer after completion of the mission, for routing information to transmit the package, the routing information comprising a destination for sending the package;
receiving, by the companion computer, the routing information comprising the destination where to send the package after completion of the mission;
sending, from the companion computer, the package to the destination that is a package storage, wherein the package comprises:
  sensor information collected by one or more sensors;
  telemetry information obtained by the robot;
  information about assets associated with the mission;
  the version identifier; and
  the routing information; and
analyzing the information of the package stored in the package store to determine results for the mission.

17. The tangible machine-readable storage medium as recited in claim 16, wherein the package further comprises:
information about equipment executing the mission;
a description of a functional hierarchy of the assets; and
date, start time, and end time of the mission.

18. The tangible machine-readable storage medium as recited in claim 16, wherein the machine further performs operations comprising:
causing presentation on a user interface of mission information and the results of the mission.

19. The tangible machine-readable storage medium as recited in claim 16, wherein the machine further performs operations comprising:
configuring, by a configuration-services module, a mission request based on equipment to be used to perform the mission.

* * * * *